(12) United States Patent
Raphaeli et al.

(10) Patent No.: US 7,511,604 B2
(45) Date of Patent: Mar. 31, 2009

(54) METHOD AND SYSTEM FOR DISTANCE DETERMINATION OF RF TAGS

(75) Inventors: Ruth Raphaeli, Kfar Saba (IL); Dan Raphaeli, Kfar Saba (IL)

(73) Assignee: Sandlinks Systems Ltd., Petach Tikva (IL)

( * ) Notice: Subject to any disclaimer, the term of this patent is extended or adjusted under 35 U.S.C. 154(b) by 404 days.

(21) Appl. No.: 10/514,118

(22) PCT Filed: May 4, 2003

(86) PCT No.: PCT/IL03/00358

§ 371 (c)(1),
(2), (4) Date: Nov. 12, 2004

(87) PCT Pub. No.: WO03/098528

PCT Pub. Date: Nov. 27, 2003

(65) Prior Publication Data

US 2007/0109099 A1      May 17, 2007

Related U.S. Application Data

(60) Provisional application No. 60/378,078, filed on May 16, 2002.

(51) Int. Cl.
*H04Q 5/22*      (2006.01)
(52) U.S. Cl. .................... 340/10.2; 340/10.1; 340/10.3; 340/10.5; 340/825.69; 340/825.72
(58) Field of Classification Search ............... 340/10.1, 340/10.2, 10.34, 10.4, 572.1, 10.5, 10.3, 340/825.69, 825.72; 342/44; 370/342
See application file for complete search history.

(56) References Cited

U.S. PATENT DOCUMENTS

| 4,827,395 | A | * | 5/1989 | Anders et al. ............... 340/10.1 |
| 5,450,492 | A | * | 9/1995 | Hook et al. ................. 340/10.2 |
| 5,489,908 | A | * | 2/1996 | Orthmann et al. ......... 340/10.31 |
| 5,521,601 | A | * | 5/1996 | Kandlur et al. ............... 342/44 |
| 5,777,561 | A |   | 7/1998 | Chieu |
| 5,838,472 | A | * | 11/1998 | Welch et al. ................ 340/10.4 |
| 5,886,634 | A | * | 3/1999 | Muhme ................... 340/572.1 |
| 5,952,922 | A | * | 9/1999 | Shober ...................... 340/10.4 |
| 5,977,913 | A |   | 11/1999 | Christ |
| 5,986,570 | A | * | 11/1999 | Black et al. ................. 340/10.2 |
| 6,150,921 | A | * | 11/2000 | Werb et al. ................. 340/10.1 |
| 6,157,321 | A | * | 12/2000 | Ricci ......................... 340/10.1 |
| 6,265,962 | B1 |   | 7/2001 | Black et al. |
| 6,335,685 | B1 |   | 1/2002 | Schrott et al. |
| 6,362,738 | B1 |   | 3/2002 | Vega |
| 6,377,203 | B1 | * | 4/2002 | Doany ......................... 342/44 |
| 6,563,417 | B1 | * | 5/2003 | Shaw ........................ 340/10.1 |
| 6,832,251 | B1 | * | 12/2004 | Gelvin et al. ............... 709/224 |

OTHER PUBLICATIONS http://en.wikipedia.org/wiki/ultra-wideband.*

* cited by examiner

*Primary Examiner*—Brian A Zimmerman
*Assistant Examiner*—Vernal U Brown
(74) *Attorney, Agent, or Firm*—Mark M. Friedman

(57) ABSTRACT

The present invention relates to a method and system (10) for distance determination of RF tags (4) and its applications based on measuring the round trip delay, avoiding deterministic collisions between a plurality of wide band response signals transmitted by the tags (4) by adding a pseudo-random time delay to the wide band response signal, and iteratively reducing the collision probability between plurality of wide band response signals.

124 Claims, 5 Drawing Sheets

METHOD AND SYSTEM FOR DISTANCE DETERMINATION OF RF TAGS

This application claims the benefit of priority of U.S. Provisional Patent Application No. 60/378,078, filed 16 May 2002

FIELD AND BACKGROUND OF THE INVENTION

The present invention relates to distance determination of RF tags, used in RF identification systems, and more particularly, to a method and system for distance determination of RF tags and its applications, based on measuring the round trip delay.

RF identification (RFID) systems are used to track objects, animals and/or people in a large range of applications. RFID systems are radio communication systems that communicate between a radio transceiver, called a reader, and a number of inexpensive devices called Tags. An RFID system generally includes a plurality of tags which are attached to objects being monitored and one or more readers which are used to communicate with the tags. An encoder is optionally used to program the tags with unique identification information.

One of the tasks commonly performed in RFID systems is determining which tags are located in the vicinity of a reader. For example, the reader may be located near a gate and it is desired to know which tags pass through the gate. Generally, the reader is transmitting broadcast signals in its vicinity and the tags receiving the broadcast signal are responding to the broadcast signal. Moreover, it is required to prevent occurrence of collisions between the response signals of different tags. Various methods have been suggested for preventing collisions. Exemplary collision overcoming methods are described in U.S. Pat. Nos. 5,777,561, 6,265,962 and 6,377,203.

In U.S. Pat. No. 5,777,561, issued to Chieu et al, there is disclosed a method for selecting groups of radio frequency RF tags for communication between a base station and the tags. The tags are selected into groups according to a physical attribute of the signal transmitted by the tags to the base station, or according to the physical response of the tags to a physical attribute of the signal transmitted from the base station to the tags.

In U.S. Pat. No. 6,265,962, issued to Black el al, there is disclosed a method for reading one or more RFID transponders that are active and capable of communicating, comprising: providing a carrier signal; detecting the presence of at least one transponder, the detecting including using a demodulator and modifying the carrier signal by suppressing the carrier signal for a predetermined number of clock cycles; receiving data from all active transponders, the receiving including receiving the data in groups of one or more bits and checking the validity of each group of data as the group is received; determining whether a valid data transmission has been received by detecting inability to compute a proper synchronization word, a proper CRC, or a proper word length; in response to determining an invalid data transmission, modifying the carrier signal to inform all active transponders that there was an incomplete read; and transmitting the complete data for each transponder to a computer system for processing.

In U.S. Pat. No. 6,377,203, issued to Doany, there is disclosed a method for simultaneously reading a serial number from multiple colliding RF signals from RF identification tags by employing a primary communication channel and multiple secondary channels. A locator or reader unit interrogates the tags, which respond with an RF signal. Upon receiving multiple signals, the locator or reader unit commands the RFID tags and requires them to transmit another response, which is transmitted in one of the secondary channels based on a portion of their unique serial identification number, thereby forcing the tags to sort in the secondary channels. These secondary channels are assigned using a portion of the unique serial identification numbers for the tags. The reader then detects an acknowledgment in the occupied secondary channels and commands a tag in a particular channel to move to the primary channel. Once the signal is transmitted in the primary channel, the reader reads the identification number. If there is further collision, the collided tags are returned to the secondary channel and sorted again using a different portion of their ID number. This process continues until all the tags are sorted and identified. Once the tags are all sorted, the tags are assigned yet another channel distinct from the secondary channels that are used for sorting.

The most significant limitation of each of the just described collision overcoming methods of U.S. Pat. Nos. 5,777,561, 6,265,962 and 6,377,203, is that all of these collision overcoming methods are time consuming. Moreover, the required time greatly increases with the number of tags participating in the collision.

In one collision avoiding method used with the ALOHA protocol (described below), transmitters re-transmitting after a collision, wait a pseudo-random period before re-transmitting the signal, so that the chance of a collision occurring between the retransmitted signals is small. The random periods are longer than the transmitted signals, such that response signals of transmitters selecting different random delays do not collide. ALOHA protocol is implemented according to the following two principles: (a) If a station has data to transmit, transmit it. (b) If transmissions collision from different stations occurs, wait a random time and transmit the data again. Additional information regarding the ALOHA protocol can be found in "Computer Communications", Principles and Business Applications, by Andy Sloane, Mcgraw Hill ISBN 0 07 709443 3.

In some applications, it is important to know that the identified tag is located within a certain distance from the reader. For example, the identification of the tag may be required in order to open a door to an access-limited area If a tag remote from the reader is identified by the reader, the door may be opened to an unauthorized individual.

One solution to that distance measurement problem is to limit the transmission range of the reader. This, however, may cause some tags not to be identified due to their orientation and/or interference.

In U.S. Pat. No. 6,335,685, issued to Schrott el al, there is disclosed an apparatus and method for locating containers and contents of containers using radio frequency tags. A base station system for communicating with radio frequency tags attached to one or more objects. The base station has computers having CPUs and memories. A separate position detector determines the position of the tags within a time increment and within a field of the base station. A communication process, executed by the CPUs, reads information from the tags within the time increment and associates the position determined with the information of the respective tag in the memories. The method features a movable base station antenna providing a narrow tag interrogation beam is used as the position detector. The antenna of the reader is designed to have rotational motion to allow for scanning in a vertical plane. Scanning accomplished as a function of position with the antenna scanning vertically while the object moves horizontally. In that mode of scanning, each tag is scanned individually as it passes the base station antenna so that the combination of horizontal object motion with vertical scanning results in a xy coordinate associated with each tag readout. The horizontal motion can be determined by knowing the velocity of the object.

However, the just described method suggesting using a separate position detector to detect the position of the tag identified by the reader is notably limited because it adds to the cost and complexity of the RFID system. In addition, the position detection is performed after the tags are identified in a separate stage, which adds to the time required for the system operation.

In U.S. Pat. No. 5,977,913, issued to Christ, there is disclosed a method for locating an object within a predetermined area comprising the steps of: (a) sensing a signal output by the object using a plurality of sensors disposed within the predetermined area; (b) forwarding a plurality of received signal levels from the plurality of sensors to a central processor; (c) comparing the plurality of received signal levels with a plurality of reference values to determine a location of the alarm signal, wherein step (c) comprises performing a best fit analysis of the plurality of received signal levels with the plurality of reference values; (d) transmitting one at a time a plurality of reference transmission signals; (e) measuring a received signal level output from each of the plurality of sensors after each transmission.

However, position detection systems, such as described in U.S. Pat. No. 5,977,913, are complex and generally require a plurality of readers in different locations.

In U.S. Pat. No. 6,362,738, issued to Vega, there is disclosed a RFID reader containing a detector circuit for detecting the presence of a signal carrier frequency transmitted by the transponder in response to a signal from the reader. The detector circuit has a resonator circuit which is connected to a receiver electrode. The resonator comprises a piezoelectric element with a high quality factor 'Q' at the resonant frequency to enhance sensitivity. The alarm carrier signal is rectified and fed to either a peak detector or an envelope detector circuit. A voltage source generates a voltage threshold to allow for operating range adjustment. A comparator compares both voltages and generates an alarm signal if the voltage signal reaches the threshold voltage. The RFID further having the capability to read the RFID contents.

The system disclosed in U.S. Pat. No. 6,362,738 limits the range of the tags it identifies by relating only to signals whose voltage level is above a predetermined threshold. The threshold may be user-adjusted in order to allow for different ranges of operation. The use of power thresholds is inaccurate, as the power may depend on the orientation of the tag and/or on obstructions between the tag and the reader. In addition, the system of U.S. Pat. No. 6,362,738 does not disclose a solution for resolving collisions when a plurality of tags respond together.

To date, the inventor is unaware of prior art teaching of a method of communicating between a reader and one or more terminal stations features receiving from a plurality of terminal stations a plurality of RF response signals, determining for the plurality of the received response signals a round trip delay, and thereby determining, for each of the response signals, a distance between the reader and the terminal station from which the response signal was received.

Moreover, the inventor is unaware of prior art teaching of a method of communicating between a reader and one or more terminal stations features receiving from a plurality of terminal stations, on a single channel, a plurality of RF response signals, determining for the plurality of the received response signals a round trip delay, and thereby determining, for each of the response signals, a distance between the reader and the terminal station from which the response signal was received.

To one of ordinary skill in the art, there is thus a need for, and it would be highly useful to have a method and a corresponding system, for determination of RF tags, based on measuring the round trip delay. Moreover, to one of ordinary skill in the art, there is also a need for a method and a corresponding system, for determination of RF tags, based on measuring the round trip delay by using a single channel. Operation by a single channel simplifies the RFID system design and reduces the cost of implementation.

It is also desirable to have a collision overcoming method consuming minimal time that is almost not increasing with the number of tags participating in the collision.

Furthermore, it is desirable to have a collision overcoming method that is relatively simple, inexpensive to implement and does not require a plurality of readers in different locations.

SUMMARY OF THE INVENTION

The present invention relates to distance determination of RF tags, used in RF identification systems, and more particularly, to a method and system for distance determination of RF tags and its applications, based on measuring the round trip delay by using a single channel.

Thus, according to the present invention, there is provided a method and a corresponding system for communicating between a reader and a plurality of RF tags, including the steps of: (a) a reader is transmitting a wide band broadcast interrogation signal, (b) at least one tag is waiting to receive the wide band broadcast interrogation signal, (c) at least one of the at least one tag is waiting to receive the wide band broadcast interrogation signal is receiving the wide band broadcast interrogation signal and transmitting at least one wide band response signal, (d) the reader receiving at least one wide band response signal, wherein the at least one wide band response signal received by the reader may include overlapping wide band response signals whenever it is comprising of a plurality of wide band response signals transmitted by a plurality of the tags, and (i) the reader detecting the distinguishable wide band response signals, transmitted by the tags, included in the at least one wide band response signal received by the reader, (ii) the reader is estimating the number of wide band response signals to the wide band broadcast interrogation signal, (iii) the reader analyzing the distinguishable wide band response signals in order to determine their round trip delay, (e) the reader is estimating whether a collision between a plurality of the wide band response signals occurred and when the reader is estimating that the collision occurred, the reader is transmitting at least one additional wide band broadcast interrogation signal. Whereby the at least one additional wide band broadcast interrogation signal is initiating a new communicating session between the reader and the plurality of RF tags in order to reduce the collision probability between the plurality of wide band response signals transmitted by the tags.

According to another aspect of the present invention, there is provided a method and a corresponding system for defining a programmable reader cell in RFID system, including the steps of: (a) a reader is transmitting a wide band broadcast interrogation signal, (b) at least one tag is waiting to receive the wide band broadcast interrogation signal, (c) at least one of these at least one tag is waiting to receive said wide band broadcast interrogation signal is receiving the wide band broadcast interrogation signal and transmitting at least one wide band response signal, (d) the reader is receiving at least one wide band response signal, wherein the at least one wide band response signal received by the reader may include overlapping wide band response signals whenever it is comprising of a plurality of wide band response signals transmitted by a plurality of tags, (e) reader detecting at least one response sequence included in the at least one wide band response signal received by reader, and deciding whether one or more tags answered to the wide band broadcast interrogation signal, (f) reader analyzing the at least one detected response sequence, in order to determine the round trip delay of at least one of the at least one wide band response signal received by the reader, (g) the reader comparing a predefined threshold to the round trip delay of at least one of at least one wide band response signal received by the reader, and performing a task with tags having round trip delay that is passing the predefined threshold test.

According to another aspect of the present invention, there is provided a method and a corresponding system for locating the position of at least one RF tag in relation to the position of at least two readers, including the steps of: (a) Each of the at least two readers is independently transmitting a wide band broadcast interrogation signal, (b) at least one tag is waiting to receive the wide band broadcast interrogation signals, (c) the at least one tag is transmitting a wide band response signal to each one of the wide band broadcast interrogation signals it received, wherein each wide band response signal includes identification information about the interrogating reader and about the transmitting tag, (d) each one of at least two readers are receiving at least one of the wide band response signals, wherein the at least one wide band response signal received by the readers may include overlapping wide band response signals whenever it is comprising of a plurality of wide band response signals transmitted by a plurality of tags, (e) each one of the at least two readers is detecting the at least one wide band response signal, deciding whether one or more tags answered to its wide band broadcast interrogation signal, and analyzing the at least one wide band response signal, transmitted by a tag, in order to determine the round trip delay and identification information, (f) each of the at least two readers is transferring distance and identity information of the tags and the reader itself to a central processing unit, by using the information transferred from each one of the at least two readers, the central processing unit is locating the position of the at least one tag in relation to the position of the at least two readers.

The present invention for distance determination of RF tags successfully address limitations of presently known methods by providing a simpler, more rapid, and therefore, more cost effective system, than currently used techniques for distance determination and discrimination of RF tags according to their distance from the reader. The method of the present invention is readily implemented using one channel or a plurality of channels, and at least one reader.

Implementation of the method and corresponding system of the present invention for distance determination of RF tags involves performing or completing selected tasks or steps manually, semi-automatically, fully automatically, and/or, a combination thereof. Moreover, according to actual instrumentation and/or equipment used for implementing a particular preferred embodiment of the disclosed method and system, several selected steps of the present invention could be performed by hardware, by software on any operating system of any firmware, or a combination thereof. In particular, as hardware, selected steps of the invention could be performed by a computerized network, a computer, a computer chip, an electronic circuit, hard-wired circuitry, or a combination thereof, involving a plurality of digital and/or analog, electrical and/or electronic, components, operations, and protocols. Additionally, or alternatively, as software, selected steps of the invention could be performed by a data processor, such as a computing platform, executing a plurality of computer program types of software instructions or protocols using any suitable computer operating system.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. Identical structures, elements or parts which appear in more than one figure are preferably labeled with a same or similar number in all the figures in which they appear. In the drawings.

DESCRIPTION OF THE PREFERRED EMBODIMENTS

Figure 1:
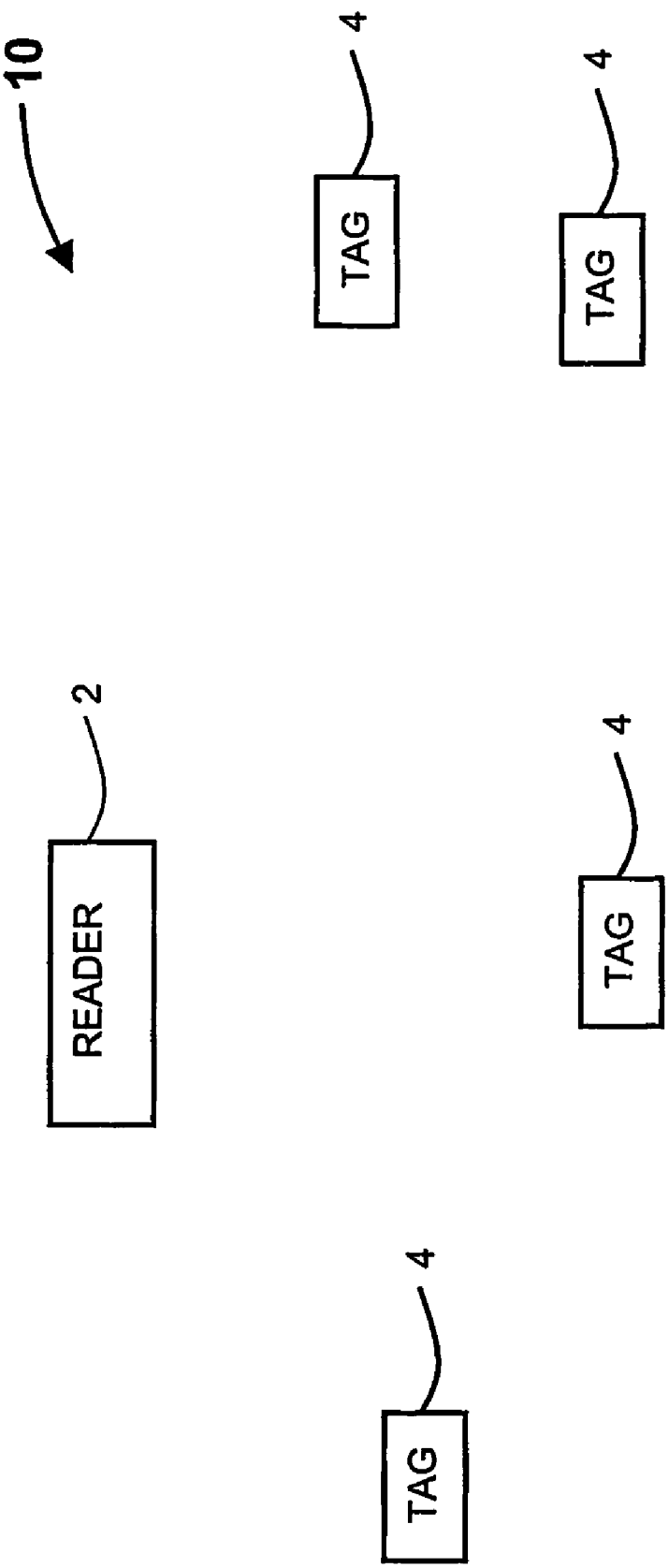
FIG. 1 is a schematic block diagram illustrating an exemplary preferred embodiment of a radio frequency identification (RFID) system, in accordance with an exemplary embodiment of the present invention.

The present invention relates to distance determination of RF tags, used in RF identification systems, and more particularly, to a method and system for distance determination of RF tags and its applications, based on measuring the round trip delay by using one or more channels.

Hereinafter, the term 'channel' refers to an allocation of resources providing a link between a transmitter and a receiver. Exemplary channels are frequency band, time slot, space direction and spreading code.

Hereinafter, the term 'wide band signals' or the equivalent term 'spread spectrum signals' refers to any spread spectrum signals types such as: direct sequence (DS), frequency-hopping (FH), multi-carrier CDMA, chirp signals, short or long pulses of any shape with or without time hopping.

Hereinafter, the term "reader cell" refers to a predetermined bounded volume, such as the volume bounded within a specified radius or between two radii. The accuracy of the bounds of the bounded volume is dictated from the implementation and the physical limitations. Tags located in the reader cell are valid tags for the current session.

The present invention features a unique method, and a corresponding RFID system featuring a reduced number of transmitted massages in relation to prior art systems, whereby the distance between a tag and a reader is measured without a preliminary synchronization and without requesting only one tag to answer to each reader transmission.

Another unique feature is the ability of defining a programmable reader cell in the RFID system of the present invention, enabling performing a task with authorized tags having round trip delay that is passing a predefined threshold test, based on the novel and unique steps of a reader transmitting a broadcast interrogation signal, at least one tag responding to the broadcast interrogation signal, reader receiving at least one response signal, wherein that at least one response signal is possibly overlapping, detecting the at least one response sequence, deciding whether one or more tags answered to the broadcast interrogation signal, and analyzing at least one response signal, transmitted by an authorized tag 4, in order to determine the round trip delay (RTD), and performing a task with authorized tags having a predetermined round trip delay (RTD).

Moreover, the present invention is enabling the user to locate the position of at least one RF tag in relation to the position of at least two readers more cost-effectively than prior art systems.

It is to be understood that the present invention is not limited in its application to the details of the order or sequence of steps of operation or implementation of the method for distance determination of RF tags or to the details of construction, arrangement, and, composition of the corresponding system and its applications, set forth in the following description, drawings, or examples. The present invention is capable of other embodiments or of being practiced or carried out in various ways. Also, it is to be understood that the phraseology, terminology, and, notation, employed herein are for the purpose of description and should not be regarded as limiting. Moreover, the method and corresponding system of the present invention can be implemented in a variety of configurations, for example, using different frequency band.

Throughout the following description and accompanying drawings there is first provided detailed description of the method and corresponding system for communicating between a reader and a plurality of RF tags of the present invention, followed thereafter by detailed descriptions of two different exemplary preferred applications of the method and corresponding system of the present invention.

The method and corresponding system for communicating between a reader and a plurality of RF tags of the present invention are illustrated in FIGS. 1-4. The method and corresponding system of the present invention are readily extendable and applicable to the following description of two different sets of exemplary preferred applications.

Figure 5:
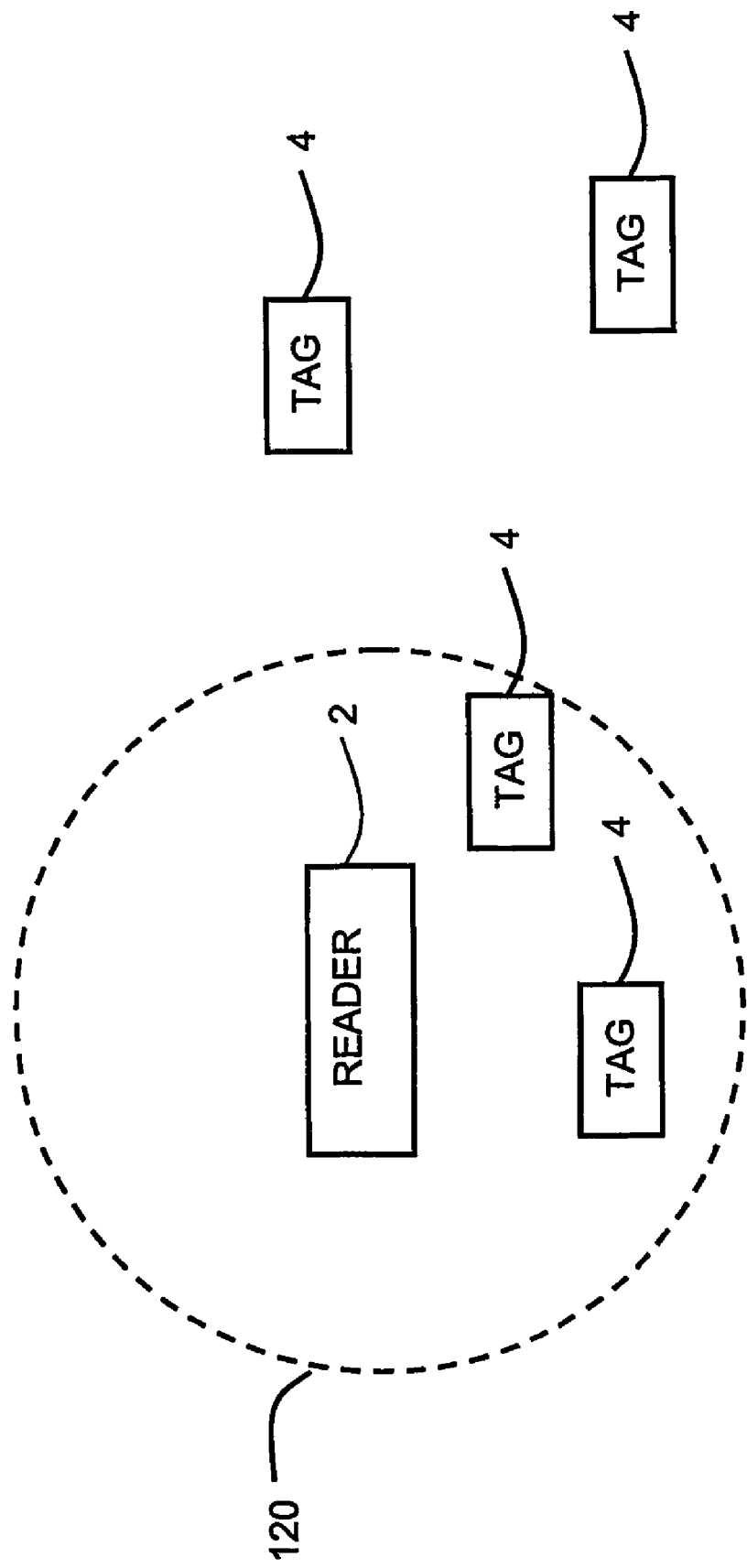
FIG. 5 is a schematic block diagram illustrating an exemplary preferred embodiment of a system for defining a programmable reader cell in RFID system, in accordance with an exemplary embodiment of the present invention.

The first set of exemplary preferred application of the method and corresponding system for communicating between a reader and a plurality of RF tags of the present invention, relates to a method and a corresponding system for defining a programmable reader cell in RFID system, as illustrated in FIG. 5.

The second set of exemplary preferred application of the method and corresponding system for communicating between a reader and a plurality of RF tags of the present invention, relates to a method and a corresponding system for locating the position of at least one RF tag in relation to the position of at least two readers.

In the following description of the method of the present invention, included are only main or principal steps needed for sufficiently understanding proper 'enabling' utilization and implementation of the disclosed method and system for distance determination of RF tags and its applications, based on measuring the round trip delay by using one or more channels. Accordingly, descriptions of the various required or optional minor, intermediate, and/or, sub steps, which are readily known by one of ordinary skill in the art, and/or, which are available in the prior art and technical literature relating to the field of sampling analog signals, are not included herein.

Steps, components, operation, and implementation of the method and corresponding system for distance determination of RF tags and its applications, based on measuring the round trip delay by using one or more channels, according to the present invention, are better understood with reference to the following description and accompanying drawings.

Referring now to the drawings, FIG. 1 is a schematic block diagram illustrating an exemplary preferred embodiment of radio frequency identification (RFID) system, in accordance with an exemplary embodiment of the present invention. RFID System 10 features the following primary components: (a) reader 2, (b) at least one RF tag 4. System 10 may include substantially any number of tags 4 from one to thousands or more. FIG. 1 shows only a few tags 4 which happened to be in the vicinity of reader 2. Other tags 4 not shown may also exist. In addition, although only one reader 2 is shown, system 10 may include a plurality of readers 2. Generally, each tag 4 is identified with a unique identification (ID) that identifies the tag 4, and system 10 is used for detecting and/or identifying and/or performing tasks with tags 4 located at a specific range from reader 2.

Each primary component, and additional components, needed for enabling the use of RFID system 10 are described in the following detailed description of the preferred embodiment of the method and corresponding system for communicating between a reader and a plurality of RF tags of the present invention.

In step (a) of the preferred method for communicating between a reader and a plurality of RF tags of the present invention there is a reader 2 transmitting a wide band broadcast interrogation signal 20.

In order to determine whether one or more tags 4 are in a specific range from reader 2, and optionally the identity of one or more tags 4, reader 2 transmits a wide band broadcast interrogation signal, sometimes shortly referred to as 'broadcast interrogation signal'. A wide band broadcast interrogation signal is a general signal, without a tag identification, that may or may not contain data. The transmission of the wide band broadcast interrogation signal may be performed at a high repetition rate, for example: every tenth of a second, so as to substantially continuously monitor the vicinity of reader 2. Alternatively, the transmission of the wide band broadcast interrogation signal may be performed at a low repetition rate, for example: according to a predetermined scheme and/or under human control. The wide band broadcast interrogation signal may be transmitted in a specific direction, by using for example a directional antenna, or may be transmitted in all directions. Hereinafter, the term 'signal' refers to one signal or to a plurality of signals transmitted in one logical transmission period.

In an exemplary embodiment of the present invention, the transmission power of reader 2 may be configured by the user, for example to limit the range in which the signals are received. Such limitation may be used for security reasons and/or in order to limit the number of tags 4 responding to wide band broadcast interrogation signals, and thus limit the chances of a collision occurring.

Figure 2:
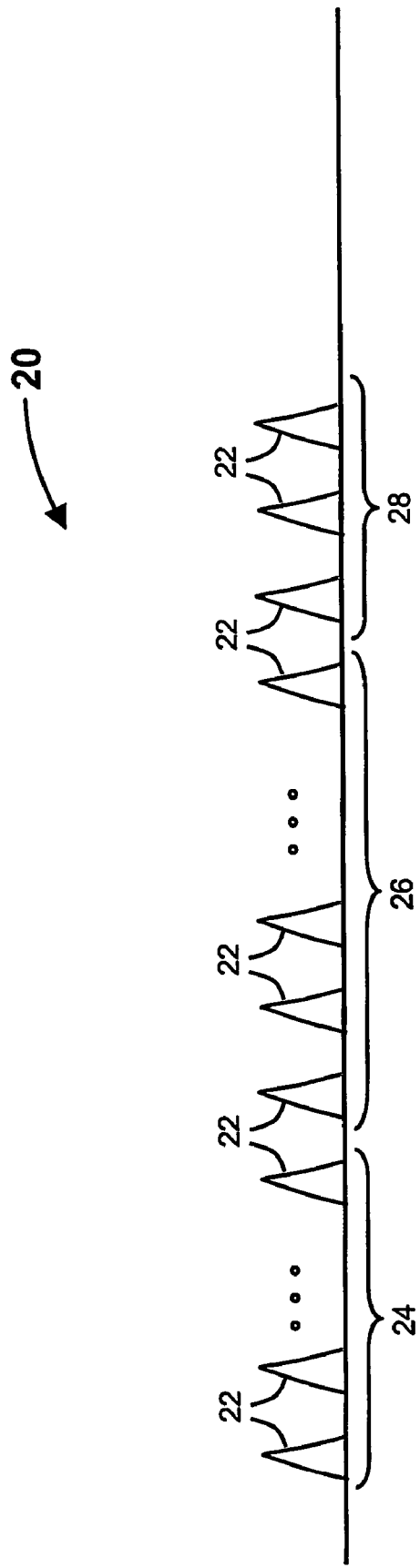
FIG. 2 is a schematic time chart illustrating an exemplary preferred embodiment of a broadcast signal, in accordance with an exemplary embodiment of the present invention.

FIG. 2 is a schematic time chart illustrating an exemplary preferred embodiment of a wide band broadcast interrogation signal 20, in accordance with an exemplary embodiment of the present invention. Optionally, wide band broadcast interrogation signal 20 features a sequence of pulses 22 separated by a fixed interval, for example 10 microseconds (it is noted that for clarity of FIG. 2, the lengths of pulses 22 and the periods there-between are out of proportion). The pulses can be either unmodulated to generated base-band transmission, or modulated onto a carrier wave to generate pass-band transmission. Each pulse 22 optionally has a short duration of, for example, 10 ns (nanoseconds). In the preferred embodiment of the present invention, pulses 22 of wide band broadcast interrogation signal 20 are optionally organized in three intervals: a preamble portion 24, a data portion 26, and a response period portion 28. Each interval may not be fixed, but be used, either periodic or not periodic, according to some pseudo-random sequence in order to reduce the collision probability between two readers 2.

Preamble portion 24 is optionally used to alert tags 4 of the command. In an exemplary embodiment of the present invention, the number of pulses 22 in preamble portion 24 is such that tag 4 will be activated and receive at least one of pulses 22 of preamble portion 24, regardless of the relative timing of reader 2 and tag 4. Optionally, preamble portion 24 includes a sufficient number of pulses, such that a plurality of pulses 22, for example, at least five, will be available to be identified in activation periods by any tag 4, in case one or more of the pulses 22 is not identified due to noise or other reasons. In an exemplary embodiment of the invention, preamble portion 24 includes about 500 pulses 22.

In an exemplary embodiment of the invention, data portion 26 of wide band broadcast interrogation signal 20 features one or more of the following fields: a delimiter field, for identifying the beginning of the message (for example, 16 bits), a reader ID field (for example, 48 bits), a command field (for example, 8 bits), a cyclic redundancy check (CRC) field (for example, 16 bits), and/or an error correction code (ECC) parity field (for example, 16 bits). It is noted that these fields and lengths are brought by way of example and any other suitable fields and/or sizes may be used with the present invention.

In an alternative exemplary embodiment of the present invention, in addition to a value representing the wide band broadcast interrogation signal 20, the command field may have other values, for example, for communication with a specific tag 4. Optionally, an authentication method, possibly a two-way authentication method, is used during the communication between reader 2 and a specific tag 4. Alternatively, an encryption method is used to prevent unauthorized eavesdropping.

Alternatively, a wide band broadcast interrogation signal 20 without modulation can be used in simple system with low requirements, and for systems not designed to discriminate between multiple concurrently operating readers.

Pulses 22 of response period portion 28 are optionally used by tags 4 to synchronize their response signals, as described hereinafter. Pulses 22 of data portion 26 are optionally modulated with specifics of the wide band broadcast interrogation signal 20, while pulses 22 of preamble portion 24 and response period portion 28 are not modulated, or modulated with a sequence known to the tags. In an alternative exemplary embodiment of the present invention, pulses 22 are modulated by changing their transmission time. For example, a '1' bit may be modulated on to a pulse 22 by 5 ns delaying the transmission of a pulse, and a '0' bit may be modulated by transmitting a pulse 5 ns in advance. Moreover, other modulation methods, for example, amplitude modulation, phase modulation, and/or frequency modulation schemes, may be used.

Figure 3:
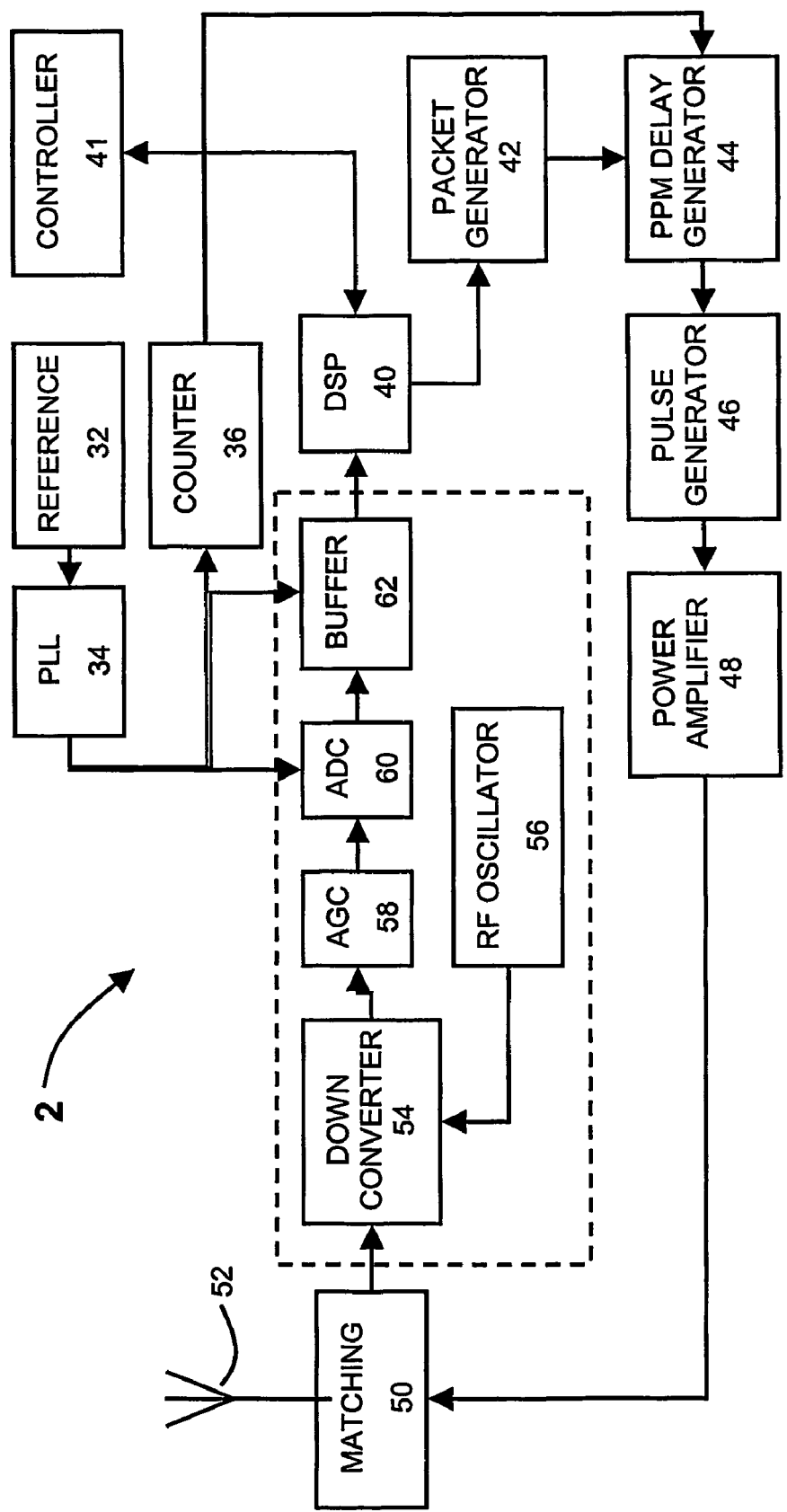
FIG. 3 is a schematic block diagram illustrating an exemplary preferred embodiment of a reader, in accordance with an exemplary embodiment of the present invention.

FIG. 3 is a schematic block diagram illustrating an exemplary preferred embodiment of a reader 2, in accordance with an exemplary embodiment of the present invention. A PLL 34 is controlled by a high frequency reference clock 32 providing a high frequency clock signal, for example 200 MHz with a 5 ns (nano second) cycle. Optionally, the clock cycle should be sufficient to sample the signal bandwidth according to Niquist criterion. A counter 36 optionally providing a low frequency signal (for example, 100 KHz) for timing the generation of pulses 22 (i.e., each low frequency signal initiates a transmission of a pulse 22). Packet generator 42 is generating the packet data of wide band broadcast interrogation signal 20. In an exemplary embodiment of the present invention, packet generator 42 providing the bits of the packet data to a pulse position modulation (PPM) delay generator 44 substantially as described below with reference to tag 4. It is noted that packet generator 42 may provide three signals, i.e., for '0', '1' and no modulation. Similarly to that described with reference to tag 4, the output of generator 44 is provided to a pulse generator 46, which passes its output to a power amplifier 48 for transmission through an antenna 52 after impedance matching 50.

Remaining components of reader 2 used for receiving the responses from tags 4 are described in step (d) of the method of the present invention.

In step (b) there is at least one tag 4 waiting to receive the wide band broadcast interrogation signal 20.

While tag 4 is waiting to receive the wide band broadcast interrogation signal 20, the tag is scanning in the time domain or scanning in the frequency domain especially whenever there is uncertainty in the frequency.

In an exemplary embodiment of the present invention featuring tags 4 scanning in the time domain, whenever tags 4 are not transmitting or receiving signals, they are deactivated into a sleep mode in order to conserve energy. Optionally, in the sleep mode, tags 4 are activated periodically with a duty cycle of, for example, 1%. In an exemplary embodiment of the invention, during the sleep mode, tags 4 are activated for about 100 ns every period of about 10 microseconds. Optionally, the time between activation periods of tags 4 is different than the time between consecutive pulses 22 of wide band broadcast interrogation signal 20, such that after up to a predetermined number of activation periods an activation period will coincide with a pulse 22. Optionally, tags 4 include a high rate counter adapted to time the activation periods.

In an exemplary embodiment of the present invention featuring tags 4 scanning in the frequency domain, tags 4 are sweeping the center frequency of the demodulator (described below) in steps such as to cover the desired frequency range. Each period of time the receiver central frequency is changed until wide band broadcast interrogation signal 20 is detected.

Optionally, tag 4 receiving the wide band broadcast interrogation signal 20 is responding to the wide band broadcast interrogation signal 20 with a response signal.

Tags 4 may be passive tags, which use energy transmitted to them to power themselves or may be active tags which are battery powered or powered by other power supplying means. In an exemplary embodiment of the present invention, passive tags 4 receive the energy they use for transmission from reader 2. Alternatively or additionally, passive tags 4 receive their energy from a field generator separate from reader 2 and/or transmitting in a separate frequency band from the wide band broadcast interrogation signal 20 of reader 2.

Figure 4:
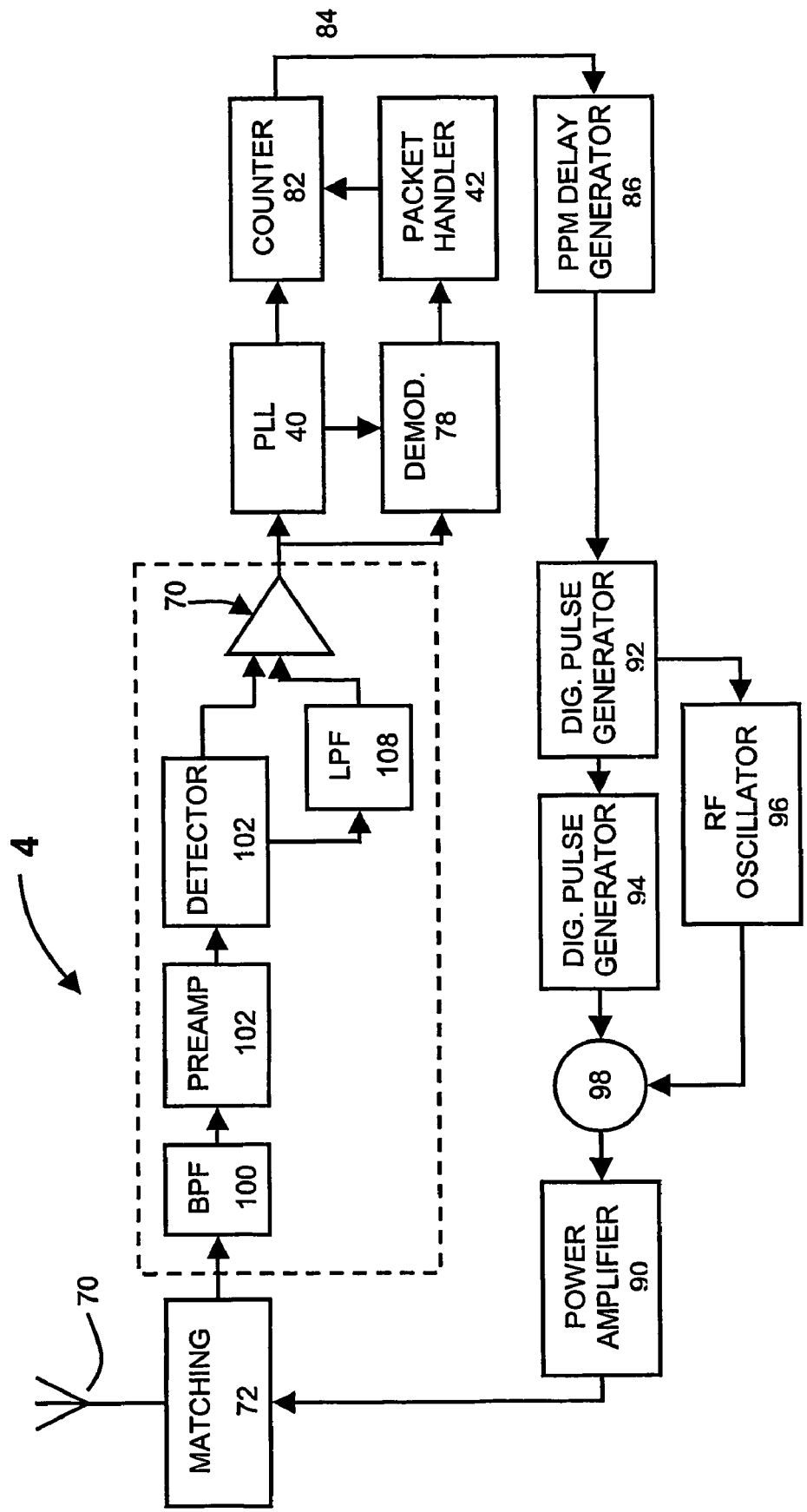
FIG. 4 is a schematic block diagram illustrating an exemplary preferred embodiment of a tag, in accordance with an exemplary embodiment of the present invention.

Referring now back to the drawings, FIG. 4 is illustrating a schematic block diagram of an exemplary preferred embodiment of a tag 4, in accordance with an exemplary embodiment of the present invention. Tag 4 features following described primary components. An antenna 70 tuned to receive wide band broadcast interrogation signal 20. An optional matching network 72 performs impedance matching between the reception and/or transmission blocks of tag 4 and antenna 70, as is known in the art. An optional switch (not shown in FIG. 4) is used for alternatively connect a reception path or a transmission path to antenna 70. A pulse detector 74 identifies pulses 22 on wide band broadcast interrogation signal 20 and provides a trigger signal responsive to each pulse 22. In an exemplary embodiment of the present invention, pulse detector 74 comprises a band pass filter (BPF) 100 which passes only frequencies used for the transmission from reader 2 to tags 4. A preamplifier 102 amplifies the signal from band pass filter (BPF) 100 and an energy detector 104 generates a signal whose voltage level represents the energy of the amplified signal. The output of detector 104 is compared in a comparator 106 to a low pass filtering of the signal, from low pass filter (LPF) 108, in order to detect pulses 22. Optionally, the output of low pass filter (LPF) 108 is amplified such that the comparison is above a predefined noise level. It is noted that instead of low pass filter (LPF) 108 any other threshold adaptation unit may be used. For example, the signal from detector 104 may be provided to a peak detector which determines the peak height of each pulse. The reference to the comparator is then optionally taken as a certain percentage (for example, 50%) of the peak level rather than being taken from low pass filter (LPF) 108. Alternatively, any other circuitry is used to implement pulse detector 74. For example, pulse detector 74 may comprise an AC block capacitor and/or a constant threshold level to which the comparison is performed.

In the exemplary embodiment of the present invention, when tag 4 identifies pulses 22 of preamble portion 24 of a signal received by antenna 70, a demodulator 78 is activated, so as to demodulate the data content of the data portion 26 of the received signal. Optionally, demodulated bits from demodulator 78 are provided to a packet handler 80 of tag 4, which is adapted to determine the content of the received signals. If a received signal includes a wide band broadcast interrogation signal 20, packet handler 80 optionally generates a response signal.

Remaining components of tag 4 used for transmitting the response are described in the following step.

In step (c) there is at least one of said at least one tag 4 waiting to receive wide band broadcast interrogation signal 20, is transmitting a wide band response signal.

After receiving a wide band broadcast interrogation signal 20 (BS), tag 4 decides whether it should respond according to a predefined logic. Examples of predefined logic are: tag 4 should not answer to every wide band broadcast interrogation signal 20, tag 4 is analyzing the wide band broadcast interrogation signal and responding only to specific reader or readers, the response of tag 4 depends on the specific receiving reader.

A large transmission range may require a relatively high power consumption and/or sophisticated hardware from tags 4. A large transmission range may be economical even with battery operated tags by using the method described below to reduce the power consumption of tags 4.

Tag 4 wide band response signal may contain data. Not depending if there is or there is no data in the wide band response signal, the tag 4 is transmitting a signal that allows reader 2 to detect the presence of a tag 4 and to measure its distance. In an exemplary embodiment of the present invention, for simplicity, the data content includes a predetermined sequence used by tag 4 in all its wide band response signals. Alternatively, the data content may include specific data customized to the specific received wide band broadcast interrogation signal 20, for example responding to a specific ID in the wide band broadcast interrogation signal 20 (such that a plurality of readers 2 may be used without interference in the same vicinity) and/or stating a random delay applied to the wide band response signal by tag 4, as described below. In an alternative exemplary embodiment of the present invention, the data content of the signals transmitted by reader 2 and/or tags 4 are encrypted by using any known in the art method.

The wide band response signal of tag 4 to the wide band broadcast interrogation signal 20 may be carried out by using one of many available methods, all of them featuring adding some time delay, or other means, to the wide band response signal in order to avoid deterministic collisions between a plurality of tags. In other words, assuring that the collisions are not persistent and therefore can be resolved by using iterations. For example: each tag 4 waits a pseudo-random period before beginning to transmit the wide band response signal, in order to prevent occurrence of a collision, in case a plurality of tags 4 respond together. Optionally, in these embodiments, each tag 4 transmits to reader 2 the length of the delay period it waited before transmitting the wide band response signals. The length of the delay period is optionally transmitted to reader 2 encoded in the wide band response signal, as described below.

Alternatively, the length of the delay period is transmitted on a separate signal.

Alternatively, the length of the random delay is in large steps relative to the possible delay values, so that the delay period may be removed by reader 2 from the measured delay, without knowledge of the length of the delay period.

Alternatively, some or all of tags 4 are adapted to transmit two or more wide band response signals with different random delay values applied to wide band broadcast interrogation signal 20. Optionally, each tag 4 determines randomly the number of wide band response signals it is to transmit. The number of wide band response signals transmitted by each tag 4 is optionally selected such that, on the average, an optimal number of wide band response signals are transmitted by all the responding tags 4, for example, 18% of the maximal possible number of wide band response signals.

Alternatively, each tag 4 responds on a channel selected randomly from a predetermined pool of channels. The channels may differ in their frequencies (for example, when using frequency division multiple access (FDMA)) and/or in their codes (for example, when using code division multiple access (CDMA)).

In an exemplary embodiment of the present invention, the wide band response signal carries the ID of the transmitting tag 4 so that reader 2 knows the identities of the responding tags 4. Alternatively, in order to simplify system 10, the wide band response signals are not encoded with the ID of the transmitting tag 4. This alternative may be used when it is only necessary to know whether there is a tag 4 in the vicinity of reader 2 and it is not important to know the identity of the tag 4. For example: in an anti-theft system one wants to get an alarm when an item is within the range of the store gate while the identity of the item is not important/needed. In this embodiment where reader 2 needs only to determine whether a tag 4 is within a certain range, the wide band response signal may be transmitted without any modulation.

Optionally, in this alternative, reader 2 may query the responding tag 4, for example using the time delay on which the wide band response was received to identify the responding tag 4. Alternatively or additionally, in embodiments in which different tags 4 respond on different channels (for example, frequency channels, and code channels). The specific channel used by the tag 4 to transmit the wide band response signal is used to query tag 4.

Hereinafter three alternative exemplary embodiments of the wide band broadcast interrogation signals and/or wide band response signals according to the present invention:

In the first exemplary embodiment of wide band broadcast interrogation signals and/or wide band response signals according to the present invention, the wide band broadcast and/or wide band response signals comprise pulse signals which include pulses separated by no-energy periods. Optionally, the no-energy periods between pulses of a signal are of a same predetermined duration, such that after tuning onto a first pulse of the signal, the receiver knows the timing of the rest of the pulses of the signal. The use of pulse signals enables the low power consumption of tags 4, as described below. In addition, the use of pulse signals enables the transmission of a plurality of wide band response signals on a single channel at overlapping times without interference. Pulses can be either base-band or pass-band, as disclosed above. In an exemplary embodiment of the invention, a transmission data rate of about 100 Kbit/sec is used, with a bandwidth of about 50 MHz centered at about 2440 MHz. The shape of the pulse may be simple, such as Gaussian shape for example. Alternatively, the shape of the pulse may be complicated with complex shape designed to decreased the peak to average ratio. Such complicated pulse has longer duration, e.g. 100 ns but has same bandwidth of 50 MHz.

In the second exemplary embodiment of wide band broadcast interrogation signals and/or wide band response signals according to the present invention, the wide band broadcast and wide band response signals feature direct sequence spread spectrum signals, which are less disturbing to surrounding apparatus. In an exemplary embodiment of the invention, a transmission data rate of about 100 Kbit/sec is used, with a bandwidth of about 50 MHz, centered at 2440 MHz. Note that considering the error correcting code or other overhead the actual information data rate is lower than 100 Kbit/sec.

In the third exemplary embodiment of wide band broadcast interrogation signals and/or wide band response signals according to the present invention, the wide band broadcast and wide band response signals comprise other type of wideband signals than described in the first two exemplary embodiments for achieving other advantages as interference rejection, frequency error rejection, better multipath immunity and more.

Referring to FIG. 4 again, in generating the wide band response signal, packet handler 80 optionally determines a data content to be modulated onto the wide band response signal. In an alternative exemplary embodiment of the present invention, for simplicity, the data content includes a predetermined sequence used by tag 4 in all its wide band response signals. Alternatively, the data content may include specific data customized to the specific received wide band broadcast interrogation signal 20, for example responding to a specific identification in the wide band broadcast interrogation signal 20 (such that a plurality of readers 2 may be used without interference in the same vicinity) and/or stating a random delay applied to the wide band response signal by tag 4, as described below. In another alternative exemplary embodiment of the present invention, the data content of the signals transmitted by reader 2 and/or tags 4 are encrypted using any method known in the art.

In an exemplary embodiment of the present invention, the data wide band response signal includes one or more of the following fields: a tag 4 ID (identification) field (for example, 48 bits); a reader ID field enabling a reader 2 to know whether the wide band response is his; a random delay field (for example, 8 bits), a CRC field (for example, 16 bits) and/or a parity field (for example, 32 bits). It is noted that these fields and lengths are brought by way of example and any other suitable fields and/or sizes may be used with the present invention. In an alternative exemplary embodiment of the present invention, the CRC field, the parity field and/or any other error correction field are a function of the expected error rate of the signal. Optionally, in system 10 in which tags 4 are expected to have a lower transmission power than readers 2, the parity field has a longer length in the wide band response signals than in the wide band broadcast interrogation signal 20. In an alternative exemplary embodiment of the present invention, the same modulation method is used by tags 4 in encoding data onto the wide band response signals, as used by reader 2 in encoding data on wide band broadcast interrogation signal 20. Alternatively, tags 4 use a different modulation method from that used by reader 2.

Optionally, the transmission of the wide band response signal pulses is timed by the received pulses 22 of wide band response period portion 28. In an exemplary embodiment of the present invention, for each received pulse 22 of wide band response period portion 28, a pulse of the wide band response signal is transmitted. For example, each tag 4 responding to the wide band broadcast interrogation signal 20 transmits a pulse of its wide band response signal responsive to a pulse 22 of wide band response portion 28. Optionally, each tag 4 transmits all the pulses of a specific wide band response signal, a predetermined delay time after receiving the pulse 22 of portion 28. In an alternative exemplary embodiment of the present invention, the predetermined delay time is selected using a pseudo-random method, for each specific signal. Thus, the same delay is used in these embodiments for all the pulses of a single wide band response signal.

Referring to FIG. 4, in an exemplary embodiment of the present invention, in parallel to preparing the data content of the wide band response signal by packet handler 80, for each pulse 22 detected by pulse detector 74, a trigger signal designating the timing of a respective pulse is provided on a line 84. The preparation of the trigger signal on line 84 is described below.

In an exemplary embodiment of the present invention, in which the data content of the wide band response signal is modulated by changing the timing of its pulses, a pulse position modulation (PPM) delay generator 86 receives the trigger signal on line 84 and the data content of the wide band response signal a bit at a time. For each received trigger, delay generator 86 alters the timing of the trigger according to the value of the data bit currently provided, and passes the altered trigger to a pulse generator 88 which generates a respective pulse. The pulse is optionally amplified by a power amplifier 90 and transmitted on antenna 70. Alternatively, separate antennas may be used for reception and transmission.

Optionally, the wide band response signal is transmitted on the same channel as wide band broadcast interrogation signal 20, and the pulses of the wide band response signal are timed to be transmitted between pulses 22, so as not to be interfered by the wide band broadcast interrogation signal 20. Alternatively, tags 4 transmit the wide band response signals on a different channel.

Optionally, pulse position modulation (PPM) delay generator 86 adds an additional constant delay to allow for backward modulation (for example, 5 ns). Alternatively, a time modulation which does not require backward timing is used, for example, addition of 0 ns for '0' and 10 ns for '1'. Alternatively, other apparatus arrangements are used for the modulation, allowing for inserting backward delays.

Referring in more detail to generating the trigger signal on line 84, In an exemplary embodiment of the present invention, tag 4 includes a phase locked loop (PLL) unit 76, which manages, based on an internal clock (not shown) of tag 4, a high rate internal timing signal at a higher rate than the rate of pulses 22. In an exemplary embodiment of the invention, the internal timing signal operates at a rate 100 times faster than pulses 22. Optionally, PLL unit 76 includes a division circuit (not shown) which produces a reduced-rate timing signal at the same rate as pulses 22. Optionally, a phase detector within PLL unit 76 compares the trigger signals of pulse detector 74 generated responsive to pulses 22 to the reduced-rate timing signal of PLL unit 76. According to the comparison of the phase detector, the timing of PLL unit 76 is corrected so as to synchronize to the timing of reader 2. Thus, the round trip delay timing measurements are not substantially affected by the fact that reader 2 and tag 4 have different clocks. In an alternative exemplary embodiment of the present invention, PLL unit 76 provides the reduced-rate timing signal to demodulator 78 which uses the reduced-rate timing signal in performing the demodulation, as is known in the art.

In an exemplary embodiment of the present invention, as mentioned above, for each wide band response signal, a random delay is selected, to prevent collisions with wide band response signals of other tags 4. A counter 82 optionally adds the random delay period to the trigger signal from pulse detector 74, so as to provide the trigger signal on line 84. In an alternative exemplary embodiment of the present invention, counter 84 receives from packet handler 80 an indication of the random delay period to be added to the trigger signal. Optionally, the indication of the random delay period is provided to counter 82 in the form of an integer number indicating a number of cycles of the high rate internal timing signal which are to form the random delay period. In an alternative exemplary embodiment of the present invention, the integer number is selected using a pseudo-random algorithm in the range of the number of cycles of the high rate internal timing signal included in the period between two pulses 22, for example, between 1 to 99. Optionally, a random delay period of 0 cycles is not used, as the internal operation delay of tag 4 would cause a delay to be added when the delay is not desired. In an alternative exemplary embodiment of the present invention, tags 4 have a low internal delay which is negligible relative to the intentionally added delay. Alternatively, tag 4 includes fast switching apparatus, such that the variable internal delay is negligible relative to the measurement accuracy of reader 2.

Alternatively, when the chances of a collision are very low and/or when other methods are used to prevent and/or resolve collisions, PLL unit 76 and counter 82 are not used and the trigger signals from pulse detector 74 are provided directly on line 84. In an exemplary embodiment of the present invention, in accordance with this alternative, reader 2 includes a PLL unit for other purposes, for example to aid in the reception of the wide band response signals and/or in the averaging of the pulse times of the wide band response signals.

Pulse generator 88 optionally comprises a digital pulse generator 92, which generates a short digital pulse, for example: 10 ns logic '1'. The short pulse is optionally provided to a shaping filter 94 which smoothes the pulse for transmission, as is known in the art. Shaping filter 94 optionally makes the pulse in the bandwidth suitable for transmission in the required band. Optionally, the shaping is performed without causing the pulses to have side lobes which may be interpreted as the pulses.

In an exemplary embodiment of the present invention, an RF oscillator 96 and a mixer 98 modulate the shaped pulse from shaping filter 94. It is noted that the shaped pulse has a duration longer than the short digital pulse, for example, of about 50 ns. Optionally, RF oscillator 96 and mixer 98 operate for the entire duration of the shaped pulse. In an alternative exemplary embodiment of the present invention, the operation of RF oscillator 96 is determined by a control signal provided by digital pulse generator 92, together with the short pulse provided to shaping filter 94.

In an exemplary embodiment of the present invention, before tag 4 begins to transmit modulated pulses of the wide band response signal in synchronization with the response period of the broadcast, tag 4 transmits, at the beginning of the response period, several (for example, 10) non-modulated pulses or modulated pulses with a sequence identical to all tags and known to the reader, during a second synchronization period of the PLL of tag 4. The object of this second synchronization period is to increase the look accuracy of the PLL. These non-modulated pulses optionally inform reader 2 of the forthcoming wide band response signal. These non-modulated pulses also optionally used in reader 2 for increasing the accuracy of estimating the number of responses to the wide band broadcast interrogation signal. Note that a collision between two tags is interpreted as a single tag response. Alternatively, the PLL synchronization period is carried out without actually transmitting the pulses.

Tag 4 can be programmed to respond only to a specific set of readers according to their reader D. This can save the power of tag 4, improve security and reduce the traffic. Alternatively or additionally, tag 4 stop answering the wide band broadcast interrogation signal 20 from a specific reader 2 after it responded to wide band broadcast interrogation signals from that specific reader a predetermined number of times in a predetermined duration. Responding to the specific reader 2 is resuming after either that predetermined duration past since last wide band response or the receive power has been changed by more than a predefined value relative to the power of the received signal to which tag 4 had responded. Tag 4 determines reader 2 identity by either using reader 2 ID, if presents in the signal received by tag 4, or by physical properties of the signal that identify reader 2, such as for example: carrier frequency or time slot. This mechanism is advantageous in two aspects: saving the power consumed by tag 4 when transmitting the wide band response signal, and reducing the traffic on the air, reducing interference to other tags that need to respond or to other wireless devices thereby reducing the collision probability.

In step (d) there is reader 2 receiving at least one wide band response signal, wherein that at least one wide band response signal received by reader 2 may include overlapping wide band response signals whenever it is including a plurality of wide band response signals transmitted by a plurality of tags 4.

Reader 2 is detecting at least one response sequence included in that at least one wide band response signal received by reader 2, counting the approximate number of distinguishable responses to that wide band broadcast interrogation signal, and analyzing the wide band response signals transmitted by the authorized tags in order to determine the round trip delay (RTD).

For each wide band response signal received by reader 2, reader 2 determines the round trip delay (RTD) between the transmission of the wide band broadcast interrogation signal 20 and the reception of the wide band response signal.

In an exemplary embodiment of the present invention, reader 2 is adapted to have a distance resolution of between few meters to few centimeters. Optionally, signals of a bandwidth of about 50 MHz, or even about 100 MHz are used. In an exemplary embodiment of the invention, the transmitted signals are in the 2.4 GHz band.

In an exemplary embodiment of the present invention, the round trip delay is determined by subtracting a predetermined correction factor from the measured time between the transmission of the wide band broadcast interrogation signal 20 and receiving the wide band response signals. The predetermined correction factor optionally compensates for a known delay of tags 4 between receiving the wide band broadcast interrogation signal 20 and transmitting the wide band response signal and/or for the operation time of reader 2. In another alternative exemplary embodiment of the present invention, the same correction factor is used for all tags 4. Alternatively, different tags 4 have different predetermined correction factors and reader 2 optionally selects the factor to be used, from a pre-configured list or a hash function, according to the identity of the specific tag 4 and/or according to any other information known about tag 4 and/or received from the tag 4. The different correction factors may be due to different hardware structures of tags 4 and/or due to a purposeful different delay configured into different groups of tags 4 in order to reduce the chances of a collision between the plurality of wide band response signals transmitted by tags 4.

In an exemplary embodiment of the present invention, as mentioned above, tags 4 delay the transmission of the wide band response signal by a pseudo-random delay period in order to reduce the chances of a collision occurring. Alternatively or additionally to reducing the predetermined correction factor, in these embodiments, reader 104 subtracts the length of the random delay period from the measured time between the transmission of the wide band broadcast interrogation signal 20 and receiving the wide band response signals.

In an exemplary embodiment of the present invention, reader 2 does not operate any collision resolution method, as the chances of a collision are low and such resolution methods are not required.

In an exemplary embodiment of the present invention, reader 2 is counting the number of valid tag responses using some validity checks methods, for example, using the CRC check. Alternatively, in case that a very large number of tags responses (hundreds to thousands) are expected, the collision rate is so high that the number of valid responses would be too low. An alternative method that is almost not sensitive to the collisions, is to detect the presence of the non modulated, or modulated with predefined sequence, period of the tag response. The property of this section of the response is that accumulation of responses of several tags is usually not destructive In an exemplary embodiment of the present invention, there are reflections that cause the transmitted wide band response signal to travel along few paths to reader 2, known in the art as the 'Multipath' effect. The Multipath effect causes inaccuracy in the delay measurements since each of the paths has different delay. Some of the well known in the art methods for dealing with the Multipath effect are adequate to the present invention. In the preferred embodiment of the present invention, there is measuring the delay of the first Multipath component, which most probably related to the line of sight (LOS) path, and therefore reflects the true distance. There are several well known in the art techniques for measuring the first Multipath component. For example: taking the rising edge of the pulse wide band response signal as made from the first Multipath by synchronizing the transmit clock of the tag 4 to the rising edge of the pulse. In another example, there is measuring in tag 4 the mean delay of all Multipath, and synchronizing the transmit clock of the tag 4 to the mean delay. One way to do this is to down-convert and sample the received signal into a signal processing circuit that correlates it with the transmitter pulse shape if the pulse shape is complex, and then take the envelope and compute the mean delay. Alternatively, such computation is carried in the frequency domain by averaging the phase difference between consecutive frequency samples. In reader 2, after receiving the transmission from tag 4, there is calculating the rising edge of the pulse by the digital signal processor (DSP), and compensating the difference between the mean and the rising edge. The just described algorithms for dealing with the Multipath effect may be implemented in reader 2 or in the tag 4 or in both of them.

In an exemplary embodiment of the present invention, controller 41 reviews the received list of tag 4 IDs to determine whether a single ID appears twice. The multiple appearances of signals from a single tag 4, i.e., with a single ID, is generally due to multi-path reflections or if the tag transmitted several times as described below. Therefore, the second occurrence of the ID tag 4, i.e., with the longer delay, is removed from the list of responding tags 4.

Referring again to FIG. 3 showing a schematic block diagram illustrating an exemplary preferred embodiment of a reader 2, in accordance with an exemplary embodiment of the present invention, reception path 38 receives wide band response signals from tags 4, optionally through antenna 52, and provides baseband digital samples of the received signals to a DSP 40. Optionally, together with the signal samples, reception path 38 provides the reception time of each sample, which is used for synchronization of software of DSP 40 to the samples from analog to digital converter (A/D) 60.

Alternatively or additionally, the reception times of the samples are determined by DSP 40 from the order in which the samples are provided to DSP 40.

In an exemplary embodiment of the present invention, reception path 38 includes a down-converter 54, an RF oscillator 56, an automatic gain control (AGC) 58 and an A/D converter 60, as is known in the art. Optionally, reception path 38 further includes a buffer 62, which stores the samples until they are handled by DSP 40.

In an exemplary embodiment of the present invention, DSP 40 analyzes the samples, using methods known in the art, to determine the timing of received pulses. The received pulses are optionally organized according to their timing relative to the transmission of a nearest previous pulse 22. The received pulses following a single pulse 22 are generally due to respective different tags 4. In an alternative exemplary embodiment of the present invention, DSP 40 collects the pulses having similar delay from pulse 22 they follow and marks them as belonging to a single tag 4.

Optionally, received pulses whose delay from their previous pulse 22 is within a maximal timing toleration factor from each other are considered having a similar delay. In an exemplary embodiment of the present invention, the toleration factor is a sum of the modulation delay (for example, 10 ns) and a timing uncertainty due to two or more pulses colliding (for example, 5-10 ns) and multipath spread (for example 25 ns).

In an exemplary embodiment of the present invention, each collection of pulses belonging to a single tag 4 is examined to determine that it includes at least a predetermined number of received pulses. Optionally, the predetermined number of required pulses is a number that allows reconstructing the data content of the wide band response signal using error correction methods. In an exemplary embodiment of the invention, the predetermined number of required pulses is at least about ⅞ of the total number of pulses in wide band response signal.

DSP 40 is optionally calculating an average time delay for collected pulse groups including at least the predetermined number of pulses. Using the average time delay, DSP 40 Is extracting the modulated data from the collected pulse groups. The timing of the pulses are optionally corrected according to their modulation (in those embodiments in which delay modulation is used), for example by adding or subtracting 5 ns according to the bit carried by the pulse group. Thereafter, a second, more accurate, average is optionally calculated. Alternatively or additionally, before calculating the second average, pulses determined to be erroneous in the error detection are removed from consideration, as their timing may be incorrect, for example, due to multi-path reflections. Pulses determined to be erroneous in the error detection may be due to a false detection and/or may otherwise contribute erroneous timing values to the timing average. In an exemplary embodiment of the present invention, a validity check, for example a CRC check, is applied to the data of the wide band response signals, and only signals which pass the validity check are considered. The validity check and the error correction may be performed in separate steps or may be performed together in a single step.

By DSP 40 calculating an average time delay for collected pulse groups including at least the predetermined number of pulses, the precision of the round trip delay determination is increased relative to a single delay measurement. In an exemplary embodiment of the present invention, the pulse form of each received pulse is interpolated from the samples received from A/D converter 60, further enhancing the precision of the round trip delay determination.

In an exemplary embodiment of the present invention, the random delay purposely added by the transmitting tag 4 is determined from the demodulated data and subtracted from the average delay, so as to receive the delay which is due to the traveling distance. Alternatively or additionally, the random delay values are provided in steps larger than the largest round trip delay of the signals, such that the random delay is subtracted by DSP 40 without relating to the contents of the signal. For example, if the range of system 10 is limited to 15 meters, the longest transmission time of signals is about 100 ns. Optionally, for this example, the random delay is in steps of 250 ns. DSP 40 then relates only to modulo of the division of the measured propagation time divided by 250 ns.

Further alternatively, a predetermined delay is subtracted from the average delay. The ID of the transmitting data is optionally also extracted from the demodulated data. The extracted ID and the delay due to the signal traveling distance are optionally transferred to a controller 41 which determines whether to relate to tag 4 or whether tag 4 should be ignored.

Alternatively to having a separate controller 41 and DSP 40, a single processor may perform the tasks of both DSP 40 and controller 41. Further alternatively, other distributions of the tasks between DSP 40 and controller 41 may be used.

In an alternative exemplary embodiment of the reception path 38 in reader 2 of FIG. 3, reception path 38 including: (a) a pulse detector, for example having the same structure as pulse detector 74 from FIG. 4 described above, which identifies the pulses in the received signals. (b) A counter provides timing counts at a relatively high rate, for example 200 MHz. (c) For each received pulse, the time at which the pulse was received (for example, the rising or falling edge of the pulse), is stored in buffer 62. In this alternative exemplary embodiment, the size of buffer 62 may be substantially smaller than in the embodiment of FIG. 3, as only the locations of the pulses need be stored. In addition, the relatively complex oscillator 56, down converter 54, AGC 58 and A/D 60 are not required. In this alternative exemplary embodiment, DSP 40 does not need to determine the timings of the pulses as described above, as this is performed by the pulse detector.

It is well understood that it is possible to separate step of distance measurement and tag 4 identification to two separate steps of distance measurement and tag 4 identification and/or use another transaction or a separate protocol for doing so without affecting the scope of the present invention.

In optional step (e) there is reducing the collision probability between a plurality of tags 4. The reader 2 is testing a predefined statistical criterion indicative of the collision probability between the tag responses and according to the result of this test there is transmitting by the reader at least one additional wide band broadcast interrogation signal 20, and at least one tag 4 may transmit a wide band response signal according to a predefined logic.

In optional sub-step 1 of step (e) there is repeating step (e) until the number of responses received by the reader in response to a wide band broadcast interrogation signal 20 is less than the predetermined statistical criterion.

In optional sub-step 2 of step (e) there is repeating step (e) additional number of times for reducing the overall collision probability.

Since the estimated number of responses can give indication on the collision probability, in an exemplary embodiment of the present invention, according to a predetermined statistical criterion applied by reader 2 on the estimated number of responses received by reader 2 in response to a wide band broadcast interrogation signal 20, reader 2 may transmit a second wide band broadcast interrogation signal 20 or a plurality of wide band broadcast interrogation signals 20 immediately after the first wide band broadcast interrogation signal 20.

Since the chances of a collision occurring increase with the number of responses received, in an exemplary embodiment of the present invention, when more than a predetermined number (T) of responses are received in response to a first wide band broadcast interrogation signal 20, reader 2 may transmits a second wide band broadcast interrogation signal 20 or a plurality of wide band broadcast interrogation signal 20 immediately after the first wide band broadcast interrogation signal 20. Optionally, the number of additional subsequent wide band broadcast interrogation signal 20 is selected according to the chances of a collision having occurred, for example, according to the number of responses received to a single wide band broadcast interrogation signal 20. The predetermined number T is optionally set as a percentage of the maximal number of responses that can be transmitted without a collision. Optionally, T is set such that a second wide band broadcast interrogation signal 20 is transmitted when the chances of a collision having occurred is greater than a predetermined percentage, for example, about 5-10%.

Optionally, the second wide band broadcast interrogation signal 20 is transmitted without a preamble portion 24, as all of tags 4 are already synchronized to reader 2. Alternatively or additionally, the second wide band broadcast interrogation signal 20 includes a different, optionally shorter, data content, from that of the first wide band broadcast interrogation signal 20. Optionally, the second wide band broadcast interrogation signal 20 includes a very short repeat message. Further alternatively, the second wide band broadcast interrogation signal 20 includes only a response portion 28. In this alternative, tags 4 optionally know to retransmit their wide band response signals according to the continued transmission of pulses 22 after the completion of response portion 28.

In an exemplary embodiment of the present invention, tags 4 are configured to respond to subsequent wide band broadcast interrogation signal 20 with a predetermined probability. Thus, the chances of a collision occurring in response to the subsequent wide band broadcast interrogation signal 20 are further decreased. Optionally, if there are still more than T responses received in response to one of the wide band broadcast interrogation signals 20, the number of wide band broadcast is increased and tag 4 response probability is appropriately decreased.

In an exemplary embodiment of the invention, if during a first transmission of wide band broadcast interrogation signal 20, more than T responses are received, a second round of 2 additional wide band broadcast interrogation signal 20 are transmitted. Each of tags 4 responds to (exactly or in the average) one of the two additional wide band broadcast interrogation signals 20 selected using a random function or a hash function of the tag's ID. Optionally, if there are still more than T responses received in response to one of the wide band broadcast interrogation signal 20, a larger number of additional wide band broadcast interrogation signal 20 are transmitted, for example, 4, and each tag 4 responds to one (exactly or in the average) of these additional wide band broadcast interrogation signals 20. This procedure is optionally repeated with increasing numbers of additional wide band broadcast interrogation signal 20 to which each tag 4 responds to only one wide band broadcast interrogation signal 20 until the number of responses received to each of the wide band broadcast interrogation signals 20 is less or equal to T.

In an exemplary embodiment of the present invention, the number of additional wide band broadcast interrogation signal 20 transmitted in each additional wide band broadcast transmission round is $2^{(L*m)}$, where m is the number of the additional transmission round (the number of times additional wide band broadcast interrogation signal 20 were transmitted) and L is a predetermined number, for example 1. Alternatively, the number of additional wide band broadcast interrogation signal 20 transmitted in each additional wide band broadcast transmission round is $L*m$, or any other function increasing with m. In an alternative exemplary embodiment of the present invention, L is adjusted according to the experience of previous collision resolution sessions in which the procedure was performed.

Alternatively or additionally to increasing the number of additional wide band broadcast interrogation signal 20 transmitted in each additional wide band broadcast round, tags 4 respond to the additional wide band broadcast interrogation signal 20 with signals having larger periods between pulses. In an exemplary embodiment of the invention, wide band broadcast interrogation signal 20 have a period of 10 microseconds between pulses. The tags optionally respond after a delay which is in steps of 100 ns, such that there are 99 responding "slots". A first additional wide band broadcast interrogation signal 20 has 20 microsecond periods between pulses 22, allowing for 199 different slots. Moreover, additional wide band broadcast interrogation signal 20 optionally have increasingly larger intervals between pulses 22. The number T of wide band response signals that need to be received in response to an additional wide band broadcast interrogation signal 20 in order to require transmission of a further wide band broadcast interrogation signal 20 optionally increases with the interval between consecutive pulses 22.

Alternatively to each tag 4 transmitting a wide band response signal to a single one of the additional wide band broadcast interrogation signal 20 of a transmission round, some or all of the tags may respond to two or more of the wide band broadcast interrogation signal 20 of the round. Alternatively to conducting an additional wide band broadcast transmission round if one of the signals received at least T responses, the determination is performed based on the average number of responses received in response to the wide band broadcast interrogation signal 20 of the current transmission round.

In optional step (f) there is reader 2 comparing a predefined threshold to the round trip delay of at least one of the at least one wide band response signal received by reader 2, and performing a task with tags having round trip delay that is passing the threshold test.

The determined round trip delay is optionally compared to an upper threshold value. For example, if the round trip delay is greater than the upper threshold value, the respective wide band response signal is ignored. The remaining wide band response signals (not ignored) after the comparison, are used by reader 2 in performing its specific application as described below.

It is noted that the threshold may be stated in terms of delay time or may be stated as a distance, in which case the time is converted into a distance before the comparison.

Moreover to comparing to an upper threshold, the determined round trip delay may be compared to a lower threshold in order to ignore tags too close to reader 2. Further alternatively or additionally, a plurality of allowed and/or prohibited ranges may be defined and the round trip delay is compared to values corresponding to these ranges.

In an exemplary embodiment of the present invention, all tags are compared against the same thresholds and/or ranges. Alternatively, different tags 4, according to their IDs are compared to different ranges. For example, certain tags 4 may allow opening of a security door only when they are within half a meter from reader 2 of the door, while other tags 4, belonging for example to high officials, may cause the opening of the door from the distance of a meter and a half. In another alternative exemplary embodiment of the present invention, certain tags 4 are not compared to any ranges at all.

In an exemplary embodiment of the present invention, instead of ignoring altogether tags 4 not in the defined range, tags 4 at different ranges may receive different handling. For example, an announcement system may be operated when more than a specific number of tags are located near reader 2. The announcement system may give different weight to different tags 4 according to their proximity to reader 2, in determining whether there are enough tags 4 to warrant operation of the announcement system. In another exemplary embodiment of the invention, tags 4 which are relatively far are reported to a human operator for verification rather than allowing automatic opening of the door.

In an exemplary embodiment of the present invention, the distance of the tag 4 may be used in determining which task is to be performed responsive to identifying the tag 4. For example, relatively far tags may cause the lights to go on or a video camera to operate while closer tags may operate an alarm.

Optionally, a user may configure reader 2 with the ranges and/or the behaviors for the ranges. In an alternative exemplary embodiment of the present invention, reader 2 has a user interface which allows configuration of the ranges. Alternatively or additionally, reader 2 is associated with one or more host computers through which the configuration is performed. In an alternative exemplary embodiment of the present invention, the configuration may depend on one or more external parameters, such as time, date, visibility conditions and/or temperature. For example, different ranges maybe used during day and night.

In another exemplary embodiment of the present invention, different tags 4 have different ranges in which they are to be related to. Optionally, in this exemplary embodiment, the wide band response signals include indication of the ranges in which tags 4 transmitting the wide band response signals are to be related to. Alternatively, the range in which a tag 4 is to be related to is a function of the specific reader 2 and the specific tag 4. For example, tags 4 may store a predetermined number of classes and reader 2 defines different ranges for each of that classes. The wide band response signals optionally include an indication of the class to which tag 4 belongs. Alternatively, the class is determined from the ID of tag 4. Optionally, tags 4 feature a human interface allowing changing the class of the tag 4 and/or changing the allowed range of the tag 4.

In an exemplary embodiment of the present invention, reader 2 is adapted to determine whether there are tags 4 belonging to system 10 in the vicinity of reader 2. For example, reader 2 may be located near a gate and monitor passage through the gate. The determination may be performed, for example, in order to identify objects attached to tags 4 which pass through a certain gate and/or to determine whether a tag 4 is near a specific door, which door is automatically opened when one of tags 4 is in its vicinity.

In another exemplary embodiment of the present invention, the range of tags to be taken into consideration by controller 41 may be adjusted in software by a human controller. This allows simple and accurate determination of the range of tags to be taken into consideration. Optionally, reader 2 includes a human interface, such as a knob or rotary wheel which allowing changing of the range. The adjusting of the range allows using reader 2 for a plurality of different tasks and/or under different conditions.

Herein described the first set of exemplary preferred application of the method and corresponding system for communicating between a reader and a plurality of RF tags of the present invention, relates to a method and a corresponding system for defining a programmable reader cell in RFID system, as illustrated in FIG. 5.

This first set of exemplary preferred application is based on the above described method and corresponding system for communicating between a reader and a plurality of RF tags of the present invention and although it is shortly described herein for brevity reasons, it is understood that it inherit all above described options and alternative embodiments and examples.

The method for defining a programmable reader cell in RFID system, including the steps of: (a) a reader is transmitting a wide band broadcast interrogation signal, (b) at least one tag is waiting to receive the wide band broadcast interrogation signal, (c) at least one of these at least one tag is waiting to receive said wide band broadcast interrogation signal is receiving the wide band broadcast interrogation signal and transmitting at least one wide band response signal, (d) the reader is receiving at least one wide band response signal, wherein the at least one wide band response signal received by the reader may include overlapping wide band response signals whenever it is comprising of a plurality of wide band response signals transmitted by a plurality of tags, (e) reader detecting at least one response sequence included in the at least one wide band response signal received by reader, and deciding whether one or more tags answered to the wide band broadcast interrogation signal, (f) reader analyzing the at least one detected response sequence, in order to determine the round trip delay of at least one of the at least one wide band response signal received by the reader, (g) the reader comparing a predefined threshold to the round trip delay of at least one of at least one wide band response signal received by the reader, and performing a task with tags having round trip delay that is passing the predefined threshold test.

The second set of exemplary preferred application of the method and corresponding system for communicating between a reader and a plurality of RF tags of the present invention, relates to a method and a corresponding system for locating the position of at least one RF tag in relation to the position of at least two readers.

This second set of exemplary preferred application is based too on the above described method and corresponding system for communicating between a reader and a plurality of RF tags of the present invention and although it is shortly described herein for brevity reasons, it is understood that it too inherit all above described options and alternative embodiments and examples.

In this second set of exemplary preferred application, the decision on which task is to be performed, responsive to identifying a tag 4, is performed based on information from more than one reader 2. For example, the determination may be performed by a central control unit, which receives readings from a plurality of readers. By using readings from a plurality of readers, the approximate location of the tag 4 may be determined and used.

The method for locating the position of at least one RF tag in relation to the position of at least two readers, including the steps of: (a) Each of the at least two readers is independently transmitting a wide band broadcast interrogation signal, (b) at least one tag is waiting to receive the wide band broadcast interrogation signals, (c) the at least one tag is transmitting a wide band response signal to each one of the wide band broadcast interrogation signals it received, wherein each wide band response signal includes identification information about the interrogating reader and about the transmitting tag, (d) each one of at least two readers are receiving at least one of the wide band response signals, wherein the at least one wide band response signal received by the readers may include overlapping wide band response signals whenever it is comprising of a plurality of wide band response signals transmitted by a plurality of tags, (e) each one of the at least two readers is detecting the at least one wide band response signal, deciding whether one or more tags answered to its wide band broadcast interrogation signal, and analyzing the at least one wide band response signal, transmitted by a tag, in order to determine the round trip delay and identification information, (f) each of the at least two readers is transferring distance and identity information of the tags and the reader itself to a central processing unit, by using the information transferred from each one of the at least two readers, the central processing unit is locating the position of the at least one tag in relation to the position of the at least two readers.

Thus, it is understood from the embodiments of the present invention herein described and illustrated above, that the method and system for distance determination of RF tags and its applications, based on measuring the round trip delay, of the present invention, are neither anticipated or obviously derived from the previous art. Moreover, implementation of the present invention results in significant advantage to the user.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It will be appreciated that the above described methods may be varied in many ways, including, changing the order of method steps, and/or performing a plurality of steps concurrently. For example, instead of reader 2 transmitting a wide band broadcast interrogation signal 20 to which tags 4 respond, in some exemplary embodiments of the present invention a tag 4 may transmit a wide band broadcast interrogation signal 20 to which readers 2 respond. In these embodiments, tags 4 may determine the distance to the responding readers, or alternatively initiate a transaction in which reader 2 measures the distance and use it.

In another example, instead of transmitting pulses carried on RF signals, the pulses are transmitted without an RF carrier, for example in accordance with UWB (ultra high bandwidth) methods.

Moreover, although the above description relates to using pulse signals for communicating between reader 2 and tags 4, other types of signals may be used, in accordance with some embodiments of the invention. For example, in an exemplary embodiment of the present invention, various spread spectrum transmission methods may be used, including direct sequence (DS), frequency-hopping (FH) and multi-carrier CDMA (MC-CDMA). Moreover, other transmission methods are used, such as chirp signals and/or short pulses or long pulses with arbitrary shapes with or without time hopping (TH).

Moreover, different sequences may be defined for different readers 2. Thus, when a plurality of readers operate in a close region, a collision corrupting one pulse of a wide band response signal does not usually prevent reader 2 from demodulating the wide band response signal.

System 10 may be used for substantially any RFID application, such as monitoring of passage of people, animals and/or objects through gates, managing inventory, sorting and/or tracking objects. In addition, system 10 may be used for security purposes, for example by providing tags 4 to authorized people or objects and allowing passage only when a reader 2 identifies a valid tag 4. It is noted that system 10 may include a plurality of readers 2 in different locations monitoring overlapping or non-overlapping areas. In an exemplary embodiment of the present invention, tags 4 carry information related to the object or person to which they are attached. Optionally, tags 4 may carry updateable data In an alternative exemplary embodiment of the present invention, readers 2 may be used to update data stored on tags 4.

In another example, tags 4 may be distributed to vehicles. Readers 2 are optionally used for monitoring traffic flow and reporting traffic jams in their vicinity (for example, within up to about 50-100 meters from reader 2). The range determination of the present invention may be used to determine which lanes are jammed according to the distance of standing vehicles from reader 2. In an alternative exemplary embodiment of the present invention, reader 2 has a narrow transmission beam, such that a specific distance from reader 2 clearly defines a specific lane. Alternatively, two or more readers 2 may be used together in determining the lanes of tags 4. Alternatively or additionally, the tags 4 of the vehicles carry priorities which indicate the lanes on which they may pass. Readers 2 are used to control the access to limited lanes. The range control of the present invention is optionally used to limit the control of reader 2 to a specific lane, rejecting responses from other adjacent lanes. Alternatively, a single reader 2 may be used to monitor different numbers of lanes. For example, during rush hour, access may be limited to two lanes, while at other hours access is limited only to one lane. The range configured into reader 2 optionally automatically changes between rush hour and non-rush hours.

In an exemplary embodiment of the present invention, tags 4 of vehicles carry fuel information and/or other maintenance data of the vehicles.

Further exemplary use environments for system 10 include airports, warehouses, animal farms, stores, golf fields, postal systems, prisons and offices.

In an exemplary embodiment of the present invention, the principles of the present invention are used for product handshaking, i.e., for making sure that two or more objects are located next to each other (e.g., are packaged together). For example, tags 4 may be attached to products and their instructions, and a hand-shaking procedure between the tags makes sure that the instructions match the product.

Alternatively to reader 2 determining the range to tags 4, in an exemplary embodiment of the present invention, tags 4 may determine the range to reader 2. In an exemplary embodiment of the invention, reader 2 transmits a wide band broadcast interrogation signal 20. Responsive to the wide band broadcast interrogation signal 20, each of the receiving tags transmits a time determining signal to reader 2, for example after a random period. Responsive to the time determining signal, reader 2 is transmitting a wide band response signal allowing tag 4 to measure the round trip delay. Based on the round trip delay, tag 4 determines the range to reader 2 and accordingly decides whether to identify to reader 2. In this embodiment, the decision on whether to communicate with reader 2 is performed by tags 4 which may be configured with different policies.

The term tag 4 used in the above description relates to substantially any unit which is attached to an object (including plants, animals and humans) for RF identification of the object. The tag 4 may be used for existence determination, unique or group ID determination and/or for storing and/or supplying additional data on the object. The tag 4 may be attached to the object using any method known in the art including physical coupling, implanting, magnetism, and other association methods even without direct contact. Tags may also be held by humans, for example in their pockets. The tag 4 may be attached to the object after its production or during production. The tag 4 may be very small (e.g., for small objects) or may be relatively large (e.g., for vehicles).

It is to be understood that using either true random or good pseudo-random number generator in the embodiment of any of the components of the present invention has no noticeable influence on the performance of system 10. Therefore writing "random" in this document should be interpreted as either random or pseudo-random and vice versa.

It is noted, however, that the present invention is not limited to use with tags. Rather, the present invention may be performed with stand alone terminal stations not tagged to other objects. In addition, the term reader is used to refer to any station used to communicate with tags 4 (or other terminal stations) and is not limited to stations which "read" any specific data.

It should be appreciated that the above described description of methods and apparatus are to be interpreted as including apparatus for carrying out the methods and methods of using the apparatus.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A method for communicating between a reader and a plurality of RF tags, comprising the steps of:
   (a) transmitting a wide band broadcast interrogation signal by a reader;
   (b) waiting to receive said wide band broadcast interrogation signal by the plurality of RF tags;
   (c) upon receiving said wide band broadcast interrogation signal by a plurality of said RF tags and in response to said wide band broadcast interrogation signal transmitting a plurality of wide band response signals respectively from said RF tags,
   (d) receiving said wide band response signals by said reader, wherein said wide band response signals each include a sequence of pulses, wherein the duration of said pulses is much less than the time interval between said pulses wherein at least two of said wide band response signals are overlapping wide band response signals, wherein said overlapping wide band response signals are distinguishable when each of said pulses of each of said wide band response signals is detectable during the time intervals between the pulses of all other said overlapping wide band response signals;
      (i) detecting by said reader and thereby distinguishing said sequences of pulses of said overlapping wide band response signals
      (ii) estimating by said reader the number of wide band response signals transmitted by said tags in response to said wide band broadcast interrogation signal,
      (iii) analyzing by said reader said distinguishable wide band response signals in order to determine their round trip delay,
   (e) testing by said reader a predefined statistical criterion indicative of the collision probability of said wide band response signals and according to the result of said testing transmitting by said reader at least one additional wide band broadcast interrogation signal, whereby each said additional wide band broadcast interrogation signal is followed by repeating the steps of said tags said transmitting in response to said additional wide band broadcast interrogation signal and said reader receiving, detecting, estimating, analyzing, testing and transmitting at least one additional wide band broadcast interrogation signal, wherein the collision probability is based at least in part on the number of overlapping wide band response signals, the duration of said pulses and the time interval between said pluses.

2. The method of claim 1, further comprising a step of:
adding a time delay respectively by at least one of said RF tags to at least one of said wide band response signals, whereby said time delay avoids deterministic collisions between the respective pulse sequences of said wide band response signals as transmitted by said tags, wherein the duration of said time delay is less than the duration of a single packet of said wide band response signal.

3. The method of claim 2, wherein said time delay is transmitted to said reader using a method selected from the group consisting of: said time delay is included in data carried within said at least one wide band response signal, and said time delay is transmitted on a separate signal.

4. The method of claim 2, wherein said time delay is a random or pseudo-random time delay.

5. The method of claim 2, further comprising the steps of: (f) at least one of said tags is waiting, according to a predefined logic, to receive said at least one additional wide band broadcast interrogation signal, and according to said predefined logic, said at least one tag transmits additional wide band response signals as a response to said at least one additional wide band broadcast interrogation signal;(g) receiving by said reader the additional at least one wide band response signal, wherein said additional at least one wide band response signal received by said reader include overlapping wide band response signals transmitted by a plurality of said tags, and (h) said reader detecting at least one additional response sequence included in said additional at least one wide band response signal received by said reader.

6. The method of claim 2, wherein the step of said at least one tag is waiting to receive said wide band broadcast interrogation signal includes said at least one tag scanning in the time domain, and whenever said at least one tag is not transmitting or receiving signals, it is deactivated into a sleep mode where it is activated periodically with a predefined duty cycle.

7. The method of claim 2, wherein the step of said at least one tag is waiting to receive said wide band broadcast interrogation signal includes said at least one tag is scanning in the frequency domain by sweeping a center frequency in predefined steps such as to cover a desired frequency range until said wide band broadcast interrogation signal is detected.

8. The method of claim 2, wherein step (c) includes, said at least one tag may transmit said wide band response signal according to a predefined logic.

9. The method of claim 2, wherein said at least one wide band response signal comprising plurality of said wide band response signals, featuring different time delay values, whereby said different time delay are reducing the collisions probability between a plurality of wide band response signals transmitted by said tags.

10. The method of claim 2, wherein said at least one wide band response signal is transmitted on the same channel of said wide band broadcast interrogation signal.

11. The method of claim 2, wherein said at least one wide band response signal is transmitted on a channel selected pseudo-randomly from a predetermined pool of channels.

12. The method of claim 2, wherein said at least one tag having means for determining the identification of the transmitting reader.

13. The method of claim 12, wherein said means for determining said identification of said transmitting reader is selected from the group consisting of: said wide band broadcast interrogation signal comprises identification of said transmitting reader, and unique predefined physical properties of said wide band broadcast interrogation signal identifying said transmitting reader.

14. The method of claim 12, wherein said tag is programmed to respond only to predefined selected readers.

15. The method of claim 12, wherein said tag stop responding to additional wide band broadcast interrogation signals from a specific reader after said tag responded to wide band broadcast interrogation signals from said specific reader a predetermined number of times in a predetermined duration.

16. The method of claim 15, wherein said tag resumes responding to said wide band broadcast interrogation signals from said specific reader after a fulfillment of a condition selected from the group consisting of: said predetermined duration past since last respond, and the receive power of said wide band broadcast interrogation signals have been changed by more than a predefined value relative to last received power when said tag responded.

17. The method of claim 2, wherein said testing a predefined statistical criterion indicative of the collision probability between a plurality of said wide band response signals is a predefined statistical test of said estimation of the number of wide band response signals that were received by said reader.

18. The method of claim 17, wherein said statistical test is comparing the value of said estimation of number of responses with a predefined threshold.

19. The method of claim 2, wherein said wide band broadcast interrogation signal is generated by using a series of pulses.

20. The method of claim 2, wherein said wide band broadcast interrogation signal is transmitted in a specific direction, by said reader utilizing a directional antenna.

21. The method of claim 2, wherein said wide band response signal is generated by using a series of pulses.

22. The method of claim 21, wherein the timing of said pulses is determined by timing means.

23. The method of claim 21, wherein said wide band response signal is modulated and said tag is transmitting a predefined number of pulses modulated by a predefined data before transmitting the modulated wide band response signal, whereby the use of said predefined number of pulses modulated by a predefined data by the reader is selected from the group consisting of: informing said reader of the forthcoming wide band response signal, estimating number of responses and letting PLL of said tag reach better synchronization accuracy before transmitting the data containing response.

24. The method of claim 2, wherein said wide band response signal includes a data portion and the step of analyzing said wide band response signals transmitted by said tags further including extracting said data.

25. The method of claim 2, wherein the value of the power of the transmissions selected from the group consisting of: said wide band broadcast interrogation signal, and said wide band response signal, and said at least one additional wide band broadcast interrogation signal, is adjusted by a user.

26. The method of claim 2, wherein the embodiment of the transmissions selected from the group consisting of: said wide band broadcast interrogation signal, and said wide band response signal, and said at least one additional wide band broadcast interrogation signal, comprising a method selected from the group consisting of: pulse signals including pulses separated by no-energy periods, and base-band pulses, and pass-band pulses, and direct sequence spread spectrum signals, and types of wide-band signals achieving a short time resolution.

27. The method of claim 26, wherein said transmissions selected from the group consisting of: said wide band broadcast interrogation signal, and said wide band response signal, and said at least one additional wide band broadcast interrogation signal, feature transmission data rate of about 100 Kbit/sec, with a bandwidth of about 50 MHz, centered at about 2.4 GHz.

28. The method of claim 2, wherein the transmitted wide band signals selected from the group consisting of said wide band broadcast interrogation signal, and said wide band response signal, and said at least one additional wide band broadcast interrogation signal, comprising a sequence of pulses.

29. The method of claim 2, wherein said wide band broadcast interrogation signal and said at least one additional wide band broadcast interrogation signal, are organized in three intervals comprising: a preamble portion, a data portion, and a response period portion.

30. The method of claim 29, wherein before said tag is beginning to transmit said wide band response signal in synchronization with said response period of said wide band broadcast interrogation signal, said tag is transmitting during a second synchronization period at the beginning of said response period, a few pulses selected from the group consisting of non-modulated pulses, and modulated pulses with a sequence identical to all tags and known to said reader; whereby said second synchronization period is increasing the accuracy of said wide band response signal.

31. The method of claim 29, wherein before said tag is beginning to transmit said wide band response signal in synchronization with said response period of said wide band broadcast interrogation signal, said tag is transmitting during a second synchronization period at the beginning of said response period, a few pulses selected from the group consisting of: non-modulated pulses, and modulated pulses with a sequence identical to all tags and known to said reader; whereby said reader using said few pulses for increasing the accuracy of said estimating the number of responses to said wide band broadcast interrogation signal.

32. The method of claim 2, wherein said round trip delay is determined by subtracting a predetermined correction factor from the measured time between the transmission of said wide band broadcast interrogation signal and receiving said wide band response signal, whereby said predetermined correction factor compensates for a predefined time delay of said at least one tag between receiving said wide band broadcast interrogation signal and transmitting said wide band response signal and predefined time delay of said reader operation.

33. The method of claim 9, wherein said predetermined correction factor having different values for different tags.

34. The method of claim 2, wherein said RFID system comprising means for dealing with a Multipath effect.

35. The method of claim 34, wherein said RFID system means for dealing with said Multipath effect are selected from the group consisting of: said reader measuring the delay of the first Multipath component, and said wide band response signal comprising identification of the transmitting tag and said reader reviews the received list of said at least one tag identifications to determine whether a single tag identification appears more than once, wherein said more than once appearance is generally due to said Multipath effect and therefore the surplus received signals having longer delay, are removed from the list of responding tags.

36. The method of claim 2, wherein step (d) further comprising analyzing each collection of pulses belonging to a single said tag for determining that it includes at least a predetermined minimum number of received pulses, whereby said predetermined minimum number of received pulses allows reconstructing the data content of said wide band response signal using error correction methods.

37. The method of claim 2, wherein said at least one additional wide band broadcast interrogation signal is selected from the group consisting of: wide band broadcast interrogation signal transmitted without a preamble portion, and wide band broadcast interrogation signal including a shorter data content relative to the data portion of the first wide band broadcast interrogation signal, and wide band broadcast interrogation including a short repeat message, and wide band broadcast interrogation signal including only a response portion.

38. The method of claim 2, further comprising said reader comparing a predefined threshold to said round trip delay of at least one of said at least one wide band response signal received by said reader, and performing a task with tags having round trip delay that is passing said predefined threshold test.

39. The method of claim 38, wherein different tags are compared to different predefined thresholds according to their tag identification.

40. The method of claim 38, wherein different tags located in different ranges from said reader receive different handling.

41. The method of claim 38, wherein the determination of said predefined threshold is selected from the group consisting of said reader have a user interface allowing a user to determine said predefined threshold, and said reader is associated with at least one host computer through which the configuration is performed, and said predefined threshold is determined according to a predefined logic initialized by external parameters, and said predefined threshold is determined according to a predefined logic initialized by a sensor measurement.

42. The method of claim 38, wherein different tags are compared to different predefined thresholds.

43. A system for communicating between a reader and a plurality of RF tags, the system comprising:
(a) the reader which transmits a wide band broadcast interrogation signal,
(b) the tags which wait to receive said wide band broadcast interrogation signal,
(c) the tags receive said wide band broadcast interrogation signal and in response transmit respectively a plurality of wide band response signals, wherein said wide band response signals each include a sequence of pulses, wherein the duration of said pulses is much less than the time interval between said pulses,
(d) the reader receives said wide band response signals, wherein said wide band response signals each include a sequence of pulses, wherein the duration of said pulses is much less than the time interval between said pulses wherein said wide band response signals include overlapping wide band response signals, wherein said overlapping wide band response signals are distinguishable when each of said pulses of each of said wide band response signals is detectable during the time intervals between the pulses of all other said overlapping wide band response signals and (i) said reader detects and distinguishes the overlapping pulse sequences included in said overlapping wide band response signals (ii) said reader estimates the number of wide band response signals to said wide band broadcast interrogation signal, (iii) said reader analyzes and thereby distinguishes between said overlapping wide band response signals in order to determine their round trip delay,
(e) said reader tests a predefined statistical criterion indicative of the collision probability of said at least one wide hand response signal and according to the result of the test said reader transmits at least one additional wide band broadcast interrogation signal, wherein the collision probability is based at least in part on the number of overlapping wide band response signals, the duration of said pulses and the time interval between said pulses.

44. The system of claim 43, wherein said at least one tag adds a time delay to its wide band response signal, whereby said time delay avoids deterministic collisions between said wide band response signals, wherein said time delay is less than said time interval between said pulses of said wide band response signals.

45. A method for defining a programmable reader cell in RFID system, comprising the steps of:
(a) transmitting a wide band broadcast interrogation signal, by a reader,
(b) a plurality of tags waiting to receive said wide band broadcast interrogation signal,
(c) said tags receiving said wide band broadcast interrogation signal and in response transmitting respectively a plurality of wide band response signals,
(d) receiving by said reader said wide band response signals, wherein said wide band response signals each include a sequence of pulses, wherein the duration of said pulses is much less than the time interval between said pulses wherein said wide band response signals received by said reader include overlapping wide band response signals, wherein said overlapping wide band response signals are distinguishable when each of said pulses of each of said wide bhand response signals is detectable during the time intervals between the pulses of all other said overlapping wide band response signals;
(e) detecting by said reader and thereby distinguishing the pulse sequences included in said overlapping wide band response signal and deciding whether one or more tags answered said wide band broadcast interrogation signal,
(f) analyzing by said reader the at least one detected wide band response signal, in order to determine the round trip delay of said at least one detected wide band response signal,
(g) said reader comparing a predefined threshold to said round trip delay of at least one of said at least one wide band response signal received by said reader, and performing a task with tags having round trip delay that is passing said predefined threshold test.

46. The method of claim 45, wherein the step of said at least one tag is waiting to receive said wide band broadcast interrogation signal includes said at least one tag is scanning in the time domain, and whenever said at least one tag is not transmitting or receiving signals, it is deactivated into a sleep mode where it is activated periodically with a predefined duty cycle.

47. The method of claim 45, wherein the step of said at least one tag is waiting to receive said wide band broadcast interrogation signal includes said at least one tag is scanning in the frequency domain by sweeping a center frequency in predefined steps such as to cover a desired frequency range until said wide band broadcast interrogation signal is detected.

48. The method of claim 45, further comprising the step of:
adding a time delay to said wide band response signal, whereby said time delay avoids deterministic collisions between a plurality of wide band response signals transmitted by said tags, wherein said time delay is less than the duration of a single packet of said wide band response signal.

49. The method of claim 48, wherein said time delay is transmitted to said reader using a method selected from the group consisting of: said time delay is included in a data carried within said wide band response signal, and said time delay is transmitted on a separate signal.

50. The method of claim 45, wherein said at least one wide band response signal comprising plurality of said wide band response signals, featuring different time delay values, whereby said different time delay are reducing the collisions probability between a plurality of wide band response signals transmitted by said tags.

51. The method of claim 45, wherein said at least one wide band response signal is transmitted on the same channel of said wide band broadcast interrogation signal.

52. The method of claim 45, wherein said at least one wide band response signal is transmitted on a channel selected pseudo-randomly from a predetermined pool of channels.

53. The method of claim 45, wherein said at least one tag having means for determining the identification of the transmitting reader.

54. The method of claim 53, wherein said means for determining said identification of said transmitting reader is selected from the group consisting of: said wide band broadcast interrogation signal comprises identification of said transmitting reader, and unique predefined physical properties of said wide band broadcast interrogation signal identifying said transmitting reader.

55. The method of claim 53, wherein said tag is programmed to respond only to predefined selected readers.

56. The method of claim 53, wherein said tag stop responding to additional wide band broadcast interrogation signals from a specific reader after said tag responded to wide band broadcast interrogation signals from said specific reader a predetermined number of times in a predetermined duration.

57. The method of claim 56, wherein said tag resumes responding to said wide band broadcast interrogation signals from said specific reader after a fulfillment of a condition selected from the group consisting of: said predetermined duration past since last respond, and the receive power of said wide band broadcast interrogation signals have been changed by more than a predefined value relative to last received power when said tag responded.

58. The method of claim 45, wherein said wide band broadcast interrogation signal is generated by using a series of pulses.

59. The method of claim 45, wherein said wide band broadcast interrogation signal is transmitted in a specific direction, by said reader utilizing a directional antenna.

60. The method of claim 45, wherein said wide band response signal is generated by using a series of pulses.

61. The method of claim 60, wherein the timing of said pulses is determined by timing means.

62. The method of claim 60, wherein said wide band response signal is modulated and said tag is transmitting a predefined number of non-modulated pulses before transmitting the modulated wide band response signal, whereby said predefined number of non-modulated pulses are informing said reader of the forthcoming wide band response signal and help in synchronizing a PLL of said reader.

63. The method of claim 45, wherein said wide band response signal includes a tag identification field and the step of analyzing said wide band response signals transmitted by said tags further including extracting said tag identification field.

64. The method of claim 45, wherein the value of the power of the transmissions selected from the group consisting of: said wide band broadcast interrogation signal, and said wide band response signal, is adjusted by a user.

65. The method of claim 45, wherein the embodiment of the transmissions selected from the group consisting of: said wide band broadcast interrogation signal, and said wide band response signal, comprising a method selected from the group consisting of: pulse signals including pulses separated by no-energy periods, and base-band pulses, and pass-band pulses, and direct sequence spread spectrum signals, and types of wide-band signals achieving a short time resolution.

66. The method of claim 65, wherein said transmissions selected from the group consisting of: said wide band broadcast interrogation signal, and said wide band response signal, feature transmission data rate of about 100 Kbit/sec, with a bandwidth of about 50 MHz, centered at about 2.4 GHz.

67. The method of claim 45, wherein the transmitted wide band signals selected from the group consisting of: said wide band broadcast interrogation signal, and said wide band response signal, comprising a sequence of pulses.

68. The method of claim 45, wherein said wide band broadcast interrogation signal, is organized in three intervals comprising: a preamble portion, a data portion, and a response period portion.

69. The method of claim 45, wherein said round trip delay is determined by subtracting a predetermined correction factor from the measured time between the transmission of said wide band broadcast interrogation signal and receiving said wide band response signal, whereby said predetermined correction factor compensates for a predefined time delay of said at least one tag between receiving said wide band broadcast interrogation signal and transmitting said wide band response signal and predefined time delay of said reader operation.

70. The method of claim 50, wherein said predetermined correction factor having different values for different tags.

71. The method of claim 45, wherein said RFID system comprising means for dealing with a Multipath effect.

72. The method of claim 71, wherein said RFID system means for dealing with said Multipath effect are selected from the group consisting of: said reader measuring the delay of the first Multipath component, and said wide band response signal comprising identification of the transmitting tag and said reader reviews the received list of said at least one tag identifications to determine whether a single tag identification appears more than once, wherein said more than once appearance is generally due to said Multipath effect and therefore the surplus received signals having longer delay, are removed from the list of responding tags.

73. The method of claim 45, further comprising analyzing each collection of pulses belonging to a single said tag for determining that it includes at least a predetermined minimum number of received pulses, whereby said predetermined minimum number of received pulses allows reconstructing the data content of said wide band response signal using error correction methods.

74. The method of claim 45, wherein said at least one additional wide band broadcast interrogation signal is selected from the group consisting of: wide band broadcast interrogation signal transmitted without a preamble portion, and wide band broadcast interrogation signal including a shorter data content relative to the data portion of the first wide band broadcast interrogation signal, and wide band broadcast interrogation including a short repeat message, and wide band broadcast interrogation signal including only a response portion.

75. The method of claim 45, further comprising said reader comparing a predefined threshold to said round trip delay of at least one of said at least one wide band response signal received by said reader, and performing a task with tags having round trip delay that is passing said predefined threshold test.

76. The method of claim 75, wherein different tags are compared to different predefined thresholds according to their tag identification.

77. The method of claim 75, wherein different tags located in different ranges from said reader receive different handling.

78. The method of claim 75, wherein the determination of said predefined threshold is selected from the group consisting of: said reader have a user interface allowing a user to determine said predefined threshold, and said reader is associated with at least one host computer through which the configuration is performed, and said predefined threshold is determined according to a predefined logic initialized by external parameters, and said predefined threshold is determined according to a predefined logic initialized by a sensor measurement.

79. The method of claim 75, wherein different tags are compared to different predefined thresholds.

80. The method of claim 45, further comprising the step of: said reader estimating the number of wide band response signals to said wide band broadcast interrogation signal, testing by said reader a predefined statistical criterion indicative of the collision probability of said at least one wide band response signal and according to the result of said test, transmitting by said reader at least one additional wide band broadcast interrogation signal, wherein the collision probability is based at least in part on the number of overlapping wide band response signals, the duration of said pulses and the time interval between said pulses.

81. The method of claim 45, further comprising whenever said reader deciding that more than a predefined number of tags answered to said wide band broadcast interrogation signal, there is repeating all steps until the number of tags answering additional wide band broadcast interrogation signal decrease to less than said predefined number of tags.

82. The method of claim 81, wherein the value of said predefined number of tags is set by a statistical criterion in accordance with the collision probability between a plurality of wide band response signals transmitted by a plurality of said tags.

83. A system for defining a programmable reader cell in RFID system, comprising:
(a) a reader which transmits a wide band broadcast interrogation signal,
(b) a plurality of tags which wait to receive said wide band broadcast interrogation signal,
(c) the tags wait to receive said wide band broadcast interrogation signal and in response to said wide band broadcast interrogation signal transmit respectively a plurality of wide band response signals, wherein said wide band response signals each include a sequence of pulses, wherein the duration of said pulses is much less than the time interval between said pluses;
(d) said reader receives said wide band response signals, wherein said wide band response signals include overlapping wide band response signals, wherein said overlapping wide band response signals are distinguishable when each of said pulses of each of said wide band response signals is detectable during the time intervals between the pulses of all other said overlapping wide band response signals;
(e) said reader detects and distinguishes the overlapping pulse sequences included in said overlapping wide band response signals, and decides whether one or more tags answered said wide band broadcast interrogation signal,
(f) said reader analyzes the at least one detected wide band response signal, in order to determine its round trip delay,
(g) said reader compares a predefined threshold to said round trip delay of said at least one detected wide band response signal, and performs a task with at least a portion of said tags having round trip delay that passes said predefined threshold test.

84. In an RFID system including at least two readers and a plurality of RF tags, a method for locating the position of at least one of the RF tags in relation to the respective positions of the at least two readers, the method comprising the steps of:
(a) transmitting respectively wide band broadcast interrogation signals, by said at least two readers,
(b) the tags waiting to receive said wide band broadcast interrogation signals,
(c) in response to said wide band broadcast interrogation signals transmitting respectively wide band response signals, by said at least one tag, in response to each of said received wide band broadcast interrogation signals, wherein each of said wide band response signals includes respective identification information about the interrogating reader and about the at least one RF tag, wherein said wide band response signals each include a sequence of pulses, wherein the duration of said pulses is much less than the time interval between said pulses;
(d) receiving respectively, at least one of said wide band response signals at each of said at least two readers, wherein said at least one wide band response signals respectively received by said readers includes overlapping wide band response signals from the RF tags, wherein said overlapping wide band response signals are distinguishable when each of said pulses of each of said wide band response signals is detectable during the time intervals between the pulses of all other said overlapping wide band response signals;
(e) detecting by distinguishing said at least one wide band response signal from said overlapping wide band response signals at each of said at least two readers, deciding whether one or more of the RF tags answered its wide band broadcast interrogation signal, and analyzing said at least one wide band response signal, in order to determine the round trip delay to and from the at least one RF tag and said identification information thereof,
(f) transferring, from each of said at least two readers, distance and said identification information of the at least one RF tags and of said reader to a central processing unit,
(g) by using the information transferred from said at least two readers, locating the position of the at least one RF tag in relation to the respective positions of said at least two readers, wherein said locating is performed by said central processing unit.

85. The method of claim 84, wherein the step of transmitting said wide band broadcast interrogation signal is by each of said at least two readers independently.

86. The method of claim 84, wherein each of said at least two readers deciding whether a collision between a plurality of said wide band response signals occurred, and if said collision occurred, said reader is transmitting at least one additional wide band broadcast interrogation signal, whereby said at least one additional wide band broadcast interrogation signal is initiating a new communicating session between said reader and said plurality of RF tags in order to reduce the collision probability between said plurality of wide band response signals transmitted by said tags.

87. The method of claim 84, wherein the step of said at least one tag is waiting to receive said wide band broadcast interrogation signal includes said at least one tag is scanning in the time domain, and whenever said at least one tag is not transmitting or receiving signals, it is deactivated into a sleep mode where it is activated periodically with a predefined duty cycle.

88. The method of claim 84, wherein the step of said at least one tag is waiting to receive said wide band broadcast interrogation signal includes said at least one tag is scanning in the frequency domain by sweeping a center frequency in predefined steps such as to cover a desired frequency range until said wide band broadcast interrogation signal is detected.

89. The method of claim 84, wherein said at least one tag may transmit said wide band response signal according to a predefined logic.

90. The method of claim 84, wherein a time delay is added to said wide band response signal, whereby said time delay is avoiding deterministic collisions between a plurality of wide band response signals transmitted by said tags.

91. The method of claim 90, wherein said time delay is transmitted to said reader using a method selected from the group consisting of: said time delay is included in a data carried within said wide band response signal, and said time delay is transmitted on a separate signal and said time delay is in large steps relative to the possible round trip delay values whereby said time delay can be removed by said at least two readers from the measured round trip delay value, without knowing the value of said time delay.

92. The method of claim 84, wherein said at least one wide band response signal comprising plurality of said wide band response signals, featuring different time delay values, whereby said different time delay are reducing the collisions probability between a plurality of wide band response signals transmitted by said tags.

93. The method of claim 84, wherein said at least one wide band response signal is transmitted on the same channel of said wide band broadcast interrogation signal.

94. The method of claim 84, wherein said at least one wide band response signal is transmitted on a channel selected pseudo-randomly from a predetermined pool of channels.

95. The method of claim 84, wherein said at least one tag having means for determining the identification of the transmitting reader.

96. The method of claim 95, wherein said means for determining said identification of said transmitting reader is selected from the group consisting of: said wide band broadcast interrogation signal comprises identification of said transmitting reader, and unique predefined physical properties of said wide band broadcast interrogation signal identifying said transmitting reader.

97. The method of claim 95, wherein said tag is programmed to respond only to predefined selected readers.

98. The method of claim 95, wherein said tag stop responding to additional wide band broadcast interrogation signals from a specific reader after said tag responded to wide band broadcast interrogation signals from said specific reader a predetermined number of times in a predetermined duration.

99. The method of claim 98, wherein said tag resumes responding to said wide band broadcast interrogation signals from said specific reader after a fulfillment of a condition selected from the group consisting of: said predetermined duration past since last respond, and the receive power of said wide band broadcast interrogation signals have been changed by more than a predefined value relative to last received power when said tag responded.

100. The method of claim 86, wherein said decision whether a collision between a plurality of said wide band response signals occurred is positive whenever more than a predetermined number of responses were received by said at least two readers.

101. The method of claim 100, wherein the value of said predetermined number of responses is set by a statistical criterion in accordance with the collision probability between a plurality of wide band response signals transmitted by a plurality of said tags.

102. The method of claim 84, wherein said wide band broadcast interrogation signal is generated by using a series of pulses.

103. The method of claim 84, wherein said wide band broadcast interrogation signal is transmitted in a specific direction, by said at least two readers utilizing a directional antenna.

104. The method of claim 84, wherein said wide band response signal is generated by using a series of pulses.

105. The method of claim 104, wherein the timing of said pulses is determined by timing means.

106. The method of claim 104, wherein said wide band response signal is modulated and said tag is transmitting a predefined number of non-modulated pulses before transmitting the modulated wide band response signal, whereby said predefined number of non-modulated pulses are informing said at least two readers of the forthcoming wide band response signal and help in synchronizing a PLL of said at least two readers.

107. The method of claim 84, wherein said wide band response signal includes a tag identification field and the step of analyzing said wide band response signals transmitted by said tags further including extracting said tag identification field.

108. The method of claim 84, wherein the value of the power of the transmissions selected from the group consisting of: said wide band broadcast interrogation signal, and said wide band response signal, is adjusted by a user.

109. The method of claim 84, wherein the embodiment of the transmissions selected from the group consisting of: said wide band broadcast interrogation signal, and said wide band response signal, comprising a method selected from the group consisting of: pulse signals including pulses separated by no-energy periods, and base-band pulses, and pass-band pulses, and direct sequence spread spectrum signals, and types of wideband signals achieving a short time resolution.

110. The method of claim 109, wherein said transmissions selected from the group consisting of: said wide band broadcast interrogation signal, and said wide band response signal, feature transmission data rate of about 100 Kbit/sec, with a bandwidth of about 50 MHz, centered at about 2.4 GHz.

111. The method of claim 84, wherein the transmitted wide band signals selected from the group consisting of: said wide band broadcast interrogation signal, and said wide band response signal, comprising a sequence of pulses.

112. The method of claim 84, wherein said round trip delay is determined by subtracting a predetermined correction factor from the measured time between the transmission of said wide band broadcast interrogation signal and receiving said wide band response signal, whereby said predetermined correction factor compensates for a predefined time delay of said at least one tag between receiving said wide band broadcast interrogation signal and transmitting said wide band response signal and predefined time delay of said at least two readers operation.

113. The method of claim 92, wherein said predetermined correction factor having different values for different tags.

114. The method of claim 84, wherein said method comprising means for dealing with a Multipath effect.

115. The method of claim 114, wherein said means for dealing with said Multipath effect are selected from the group consisting of: said at least two readers measuring the delay of the first Multipath component, and said wide band response signal comprising identification of the transmitting tag and said at least two readers reviews the received list of said at least one tag identifications to determine whether a single tag identification appears more than once, wherein said more than once appearance is generally due to said Multipath effect and therefore the surplus received signals having longer delay, are removed from the list of responding tags.

116. The method of claim 84, further comprising each of said at least two readers analyzing each collection of pulses belonging to a single said tag for determining that it includes at least a predetermined minimum number of received pulses, whereby said predetermined minimum number of received pulses allows reconstructing the data content of said wide band response signal using error correction methods.

117. The method of claim 84, wherein said at least one additional wide band broadcast interrogation signal is selected from the group consisting of: wide band broadcast interrogation signal transmitted without a preamble portion, and wide band broadcast interrogation signal including a shorter data content relative to the data portion of the first wide band broadcast interrogation signal, and wide band broadcast interrogation including a short repeat message, and wide band broadcast interrogation signal including only a response portion.

118. The method of claim 84, further comprising said at least two readers comparing a predefined threshold to said round trip delay of at least one of said at least one wide band response signal received by said at least two readers, and performing a task with tags having round trip delay that is passing said predefined threshold test.

119. The method of claim 118, wherein different tags are compared to different predefined thresholds according to their tag identification.

120. The method of claim 118, wherein different tags located in different ranges from said at least two readers receive different handling.

121. The method of claim 118, wherein the determination of said predefined threshold is selected from the group consisting of: said at least two readers have a user interface allowing a user to determine said predefined threshold, and said at least two readers are associated with at least one host computer through which the configuration is performed, and said predefined threshold is determined according to a predefined logic initialized by external parameters, and said predefined threshold is determined according to a predefined logic initialized by a sensor measurement.

122. The method of claim 118, wherein different tags are compared to different predefined thresholds.

123. The method of claim 84, wherein said central processing unit each of said at least two readers transferring distance and identity information of said tags and said reader itself to a central processing unit.

124. An RFID system including at least two readers and a plurality of RF tags, the system for locating the position of at least one of the RF tags in relation to the relative positions of the at least two readers, the system comprising:
   (a) each of said at least two readers transmits a wide band broadcast interrogation signal,
   (b) the RF tags waits to receive said wide band broadcast interrogation signals,
   (c) the RF tags transmit a wide band response signal to each of said wide band broadcast interrogation signals received, wherein each of said wide band response signals includes identification information about the interrogating reader and about said transmitting RF tag, wherein said wide band response signals each include a sequence of pulses, wherein the duration of said pulses is much less than the time interval between said pulses;
   (d) each of said at least two readers receives at least one of said wide band response signals, wherein said at least one wide band response signal received by said readers include overlapping wide band response signals, wherein said overlapping wide band response signal are distinguishable when each of said pulses of each of said wide band response signals is detectable during the time intervals between the pulses of all other said overlapping wide band response signals;
   (e) each of said at least two readers detects said at least one wide band response signal, decides whether the at least one of the RF tags answered its wide band broadcast interrogation signal, and analyzes said at least one wide band response signal, transmitted by said at least one RF tag, in order to determine the round trip delay to and from the at least one RF tag and said identification information thereof,
   (f) each one of said at least two readers transfers distance and identity information of said at least one RF tag and of said reader itself to a central processing unit,
   (g) by using the information transferred from said at least two readers, said central processing unit locates the position of said at least one tag in relation to the relative positions of said at least two readers.

* * * * *